United States Patent
Baisley et al.

Patent Number: 6,106,574
Date of Patent: Aug. 22, 2000

[54] COMPUTER-IMPLEMENTED OBJECT-ORIENTED METHOD FOR RELATING OBJECTS IN A COMPILER TO LOCATIONS IN THE SOURCE PROGRAM AND TO INLINED CALL HISTORIES

[75] Inventors: Donald Edward Baisley, Laguna Hills; Jonathan Virgil Ziebell, Trabuco Canyon, both of Calif.

[73] Assignee: Unisys Corp., Blue Bell, Pa.

[21] Appl. No.: 09/294,985

[22] Filed: Apr. 20, 1999

Related U.S. Application Data

[62] Division of application No. 08/985,069, Dec. 4, 1997, abandoned.

[51] Int. Cl.[7] .................................................. G06F 9/445
[52] U.S. Cl. ..................... 717/5; 717/2; 717/3; 717/6; 717/7; 717/8; 717/9; 717/10
[58] Field of Search ..................... 395/703, 704, 395/705, 706, 707, 708, 709; 717/2, 3, 5, 6, 7, 8, 9, 10

[56] References Cited

U.S. PATENT DOCUMENTS

| | | | |
|---|---|---|---|
| 5,375,242 | 12/1994 | Kumar et al. | 717/7 |
| 5,432,903 | 7/1995 | Frid-Nielsen | 345/349 |
| 5,535,391 | 7/1996 | Hejlsberg et al. | 717/9 |
| 5,713,010 | 1/1998 | Buzbee et al. | 345/507 |
| 5,740,443 | 4/1998 | Carini | 717/5 |
| 5,790,861 | 8/1998 | Rose et al. | 717/5 |
| 5,835,773 | 11/1998 | Dunn | 717/5 |
| 5,850,554 | 12/1998 | Carver | 717/10 |
| 5,862,398 | 1/1999 | Hampapuram et al. | 712/24 |
| 5,978,587 | 11/1999 | Baisley et al. | 717/8 |

OTHER PUBLICATIONS

Hank et al., "Region–Based Compilation: An Introduction and Motivation", IEEE, pp. 158–168, 1995.

Aho et al., "Compilers Principles, Techniques and Tools", Addison–Wesley, pp. 10–11, 428–449, Mar. 1988.

*Primary Examiner*—Tariq R. Hafiz
*Assistant Examiner*—Ted T. Vo
*Attorney, Agent, or Firm*—J. Ronald Richebourg; Mark T. Starr; Steven B. Samuels

[57] ABSTRACT

An object-oriented method and apparatus for relating objects in a compiler program running on a computer for compiling source files into a binary code file for execution on a target computer to source code locations, said apparatus includes a type of object that identifies a source location, and where inlining occurs, a list of inlined source locations. The type of object has only one instance variable, an integer. The invention includes a method for relating objects in a compiler to source code locations. The method includes the steps of registering source files and their ranges of line numbers for a source type; for each language element parsed by the compiler, creating a source object for its source location; and, creating an instance variable of type source for each compiler object in order to relate to their source locations.

22 Claims, 20 Drawing Sheets

FIG. 2A

SRCCOARSETBL (ROOTSRCTBL)

| MYLASTX | 0 |
| MYCURRENTX | 0 |
| MYCOARSELVL | 0 |
| MYCOARSETBL | |

| # | MYFIRSTX | MYLASTX | MYTBLRANGETYPE | MYSRCTABLEPTR |
|---|---|---|---|---|
| 0 | 1 | 8 | FINE | (F1) |
| ... | | | ... | ... |
| N | | | | |

FIG. 2B

SRCFINETBL (F1)

| MYLASTX | 2 |
| MYCURRENTX | 0 |
| MYFINETBL | |

| # | MYFIRSTX | MYLASTX | MYRANGETYPE SIMPLE INLINED | MYSRCFILENAME MYCALLX | MYOBJFILENAME MYFUNCDEFX | MYLINENUM MYFUNCID |
|---|---|---|---|---|---|---|
| 0 | 1 | 1 | SIMPLE | FILE2.CPP | FILE2.OBJ | 1 |
| 1 | 2 | 3 | SIMPLE | FILE1.CPP | FILE2.OBJ | 1 |
| 2 | 4 | 8 | SIMPLE | FILE2.CPP | FILE2.OBJ | 2 |
| ... | | | | ... | ... | |
| N | | | | | | |

FIG. 2C

SRCCOARSETBL (ROOTSRCTBL)

| MYLASTX | 0 |
| MYCURRENTX | 0 |
| MYCOARSELVL | 0 |
| MYCOARSETBL | |

| # | MYFIRSTX | MYLASTX | MYTBLRANGETYPE | MYSRCTABLEPTR |
|---|---|---|---|---|
| 0 | 1 | 12 | FINE | (F1) |
| ... | ... | ... | ... | ... |
| N | | | | |

FIG. 2D

SRCFINETBL (F1)

| MYLASTX | 4 |
| MYCURRENTX | 0 |
| MYFINETBL | |

| # | MYFIRSTX | MYLASTX | MYRANGETYPE | MYSRCFILENAME MYCALLX | MYOBJFILENAME MYFUNCDEFX | MYLINENUM MYFUNCID |
|---|---|---|---|---|---|---|
| 0 | 1 | 1 | SIMPLE | FILE2.CPP | FILE2.OBJ | 1 |
| 1 | 2 | 3 | SIMPLE | FILE1.CPP | FILE2.OBJ | 1 |
| 2 | 4 | 8 | SIMPLE | FILE2.CPP | FILE2.OBJ | 2 |
| 3 | 9 | 10 | INLINED | 6 | 2 | F |
| 4 | 11 | 12 | INLINED | 7 | 2 | F |
| ... | ... | ... | ... | ... | ... | ... |
| N | | | | | | |

COMPUTER-IMPLEMENTED OBJECT-ORIENTED METHOD FOR RELATING OBJECTS IN A COMPILER TO LOCATIONS IN THE SOURCE PROGRAM AND TO INLINED CALL HISTORIES

This is a division of application Ser. No. 08/985,069, filed Dec. 4, 1997 now abandoned.

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to the field of compiling source programs into binary programs for execution on computing systems, and more particularly to a method for relating objects in a compiler to their respective source locations.

BACKGROUND OF THE INVENTION

A compiler is a computer program that reads source files of another program to produce a binary file, which is required for execution by a computer. The source files describe the program using a computer language such as C, C++, COBOL or the like. The binary file produced by the compiler contains a series of binary machine instructions for a particular type of computer. Moreover, the compiler generates diagnostic messages when it detects errors in the source files. A compiler is distinguished from an assembler by the fact that each input statement does not, in general, correspond to a single machine instruction or fixed sequence of instructions. A compiler may support such features as automatic allocation of variables, arbitrary arithmetic expressions, control structures such as FOR and WHILE loops, variable scope, input/output operations, higher-order functions and portability of source code.

A source file can contain compiler directives that cause other source files to be included. A compilation unit is a single source program file given to the compiler, plus all the source program files included directly or indirectly by that file. A binary file can contain machine instructions from one or more compilation units, and a compilation unit can come from multiple source files. Sometimes the machine instructions of a single compilation unit are saved in a separate binary file, called an object file. Object files are then combined by a linker to create a final binary file.

A compiler that has been programmed with the use of objects must relate its objects (representing a program being compiled) to locations within the source files. The parsing phase of compilation creates objects representing program elements, such as functions, statements and expressions. The code generation phase of compilation involves generating machine instruction objects for the program element objects. Locations in the source files must be captured and maintained for the program element objects and then passed on to the respective machine instruction objects. A source location usually consists of a source file name and a line number within the source file.

The compiler uses the source locations of its objects in at least two cases. First, the compiler shows a source location when issuing a diagnostic message to inform the compiler's user of an error location. Secondly, the compiler places a table in the binary file with the machine instructions mapping the instructions to their corresponding source locations. This table is used for debugging when the machine instructions are loaded from the binary file into a computer system's memory and executed. If processing of the machine instructions is interrupted, a debugger or other diagnostic software can use the table to find the source location that corresponds with the current point of execution of machine instructions. If call instructions are used, the debugger or other diagnostic software can also use the table to find the source locations of the series of calls that arrived at the interrupted machine instruction. The list of source locations, starting with the point of interruption followed by the source locations of the calls that arrived there in order of most recent call to first call, is referred to as a call history.

One type of prior art compiler processed a source file in a single pass by reading the source file and generating machine instructions at the same time. Typically included in this type of one-pass compiler are running variables holding the current source file name and line number, which are used to correlate between the original source file and the generated binary code. Such a straightforward correlation is adequate for a one-pass compiler but is too simplistic to cover most compiler requirements of today.

Many compilers today scan source files to create objects representing program elements. The compiler then makes multiple passes over the objects in order to verify correctness, find optimization opportunities and generate machine instructions. Some compilers then make one or more additional passes over the machine instructions to find still more optimization opportunities. Optimizations cause objects to sometimes be moved in their respective order and sometimes replaced by other new objects. These relocations and replacements happen to both program element objects and machine instruction objects. The prior art for relating machine instructions to source locations in typical multipass compilers uses two instance variables in each object. The first variable points at a source file name using either a memory address or an index into a table of names. The second variable holds a line number within the named file. These two variables must be set as objects are created while scanning source files, and then they must be copied to other objects created in later passes, such as for optimization and code generation. In some compilers the two variables are combined into one variable that holds an index into a list of ranges of line numbers with source files.

A common and important optimization called "inlining" causes a major problem with the way source locations are managed by the prior art compilers. The term "inlining" as used herein shall mean the replacing of a function with an instance of the function's body. When a compiled program is interrupted, the locations of call instructions are used to look up source locations to build a complete call history. Inlining causes call instructions to be removed. A compiler copies the objects representing the body of an inlined function in place of a call on the function. Using the method of the prior art, each copied object can be related to only one source location. So the compiler can preserve either the location of the call or the location within the inlined function, but not both. The result is that a call history reported by a debugger or other diagnostic software is incomplete. Gaps in the call history as a result of inlining cause confusion and create misleading results.

SUMMARY OF THE INVENTION

The present invention is an object-oriented method in a computer system that provides an improved technique for relating source program locations to objects within a compiler. The present invention supports complete call histories, even when inlining; and, accommodates the rearrangement and substitution of both program elements and machine instructions resulting from compiler optimization. The present invention supports having source location information in the many objects within a compiler with minimal overhead. The method of the present invention employs objects, which can be readily adapted for use in any compiler employing objects.

It is an object of the present invention to provide a new and improved computer-implemented method for relating objects in a compiler to source program locations that overcomes the shortcomings and disadvantages of the prior art.

A feature of the present invention resides in the use of object-oriented programming to represent source file locations that become part of all objects representing programming elements and machine instructions.

Another feature of the present invention resides in the capability of supporting complete call histories, even when inlining.

Yet another feature of the present invention is the ability to accommodate the rearrangement and substitution of both program elements and machine instructions resulting from compiler optimization.

An advantage of the present invention resides in the encapsulation of source location management in objects that can be readily adapted for use in any compiler using objects. This encapsulation simplifies the complexities of dealing with call histories where inlining has occurred.

Still other objects, features and advantages of the present invention will become readily apparent to those skilled in the art from the following detailed description, wherein is shown and described only the preferred embodiment of the invention simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims.

BRIEF DESCRIPTION OF THE DRAWINGS

FIGS. 2A through 2D illustrate the coarse and fine tables for both conditions where the function f from TABLE I is not inlined as well as inlined.

DETAILED DESCRIPTION OF ONE EMBODIMENT

Figure 1:
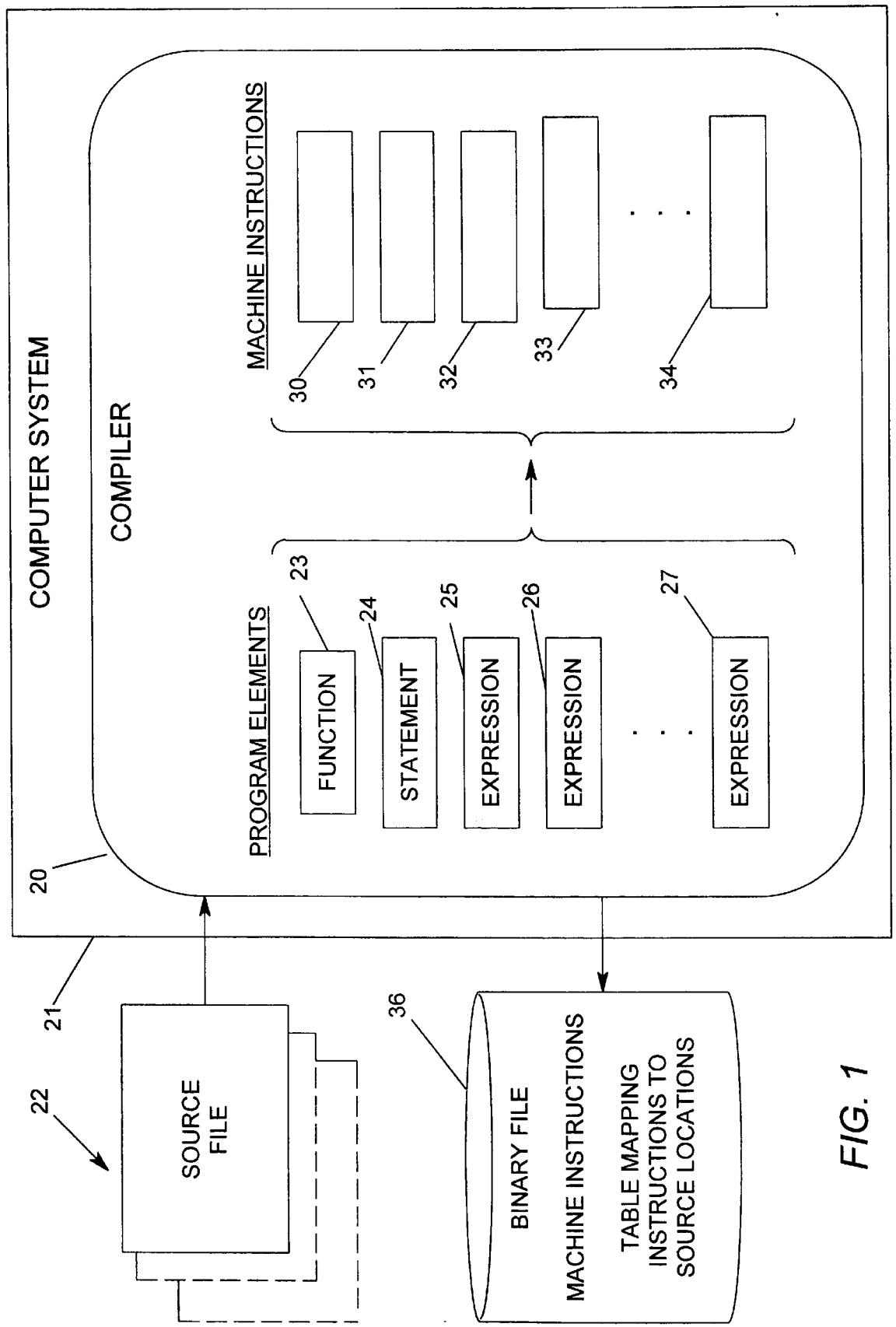
FIG. 1 is a block diagram illustrating the flow of information through a compiler running in a computer system, from source files to objects for program elements, and then to objects representing machine instructions and finally to a binary file.

A background of object oriented programming concepts and related definitions, which are helpful in understanding the method described herein, are set forth hereinbelow:

Object-oriented programming is defined as a method of implementation in which programs are organized as cooperative collections of objects, each of which represents an instance of some type. See a text entitled *Object-Oriented Analysis and Design*, by Grady Booch, 1994.

An object is an abstract representation of a real-world concept or thing—such as a person, a software package, or an event. In a computer system memory, the state of an object is represented by the values of instance variables defined for the object's type. For example, the state of a person object might be a name, birth date, spouse, etc.

The behavior of an object is the set of operations that the object can perform. In the computer system, the behavior of an object is represented by the operations defined for the object's type.

Objects in the memory of a computer system represent real-world or conceptual entities. An object occupies a portion of memory which contains named instance variables for storing information about the entity. An object also provides operations that can be performed by the computer processor for accessing and modifying the information.

Types

A type is a template that describes the instance variables and operations that an object possesses. A type defines a pattern that can be used to create or identify objects; it does not contain the actual object. A type can also be a base for other types.

Objects described by a type are called instances of that type. Types derived from a base type are called subtypes of that type. A type that is used to define only other types and not objects is said to be abstract.

The definition of a subtype identifies the base types from which it is derived. A type cannot be a subtype of itself. A subtype inherits all the instance variables and operations of its base types. It can be customized by adding new instance variables and operations. For example, a type called Manager defined as a subtype of Employee would inherit all the instance variables and operations of Employee and would define additional instance variables and operations of its own. An object of type Manager would then have all the instance variables defined by the Employee and Manager types, and would have all the operations defined by both types.

Instance Variables

The memory used by an object contains instance variables. Each instance variable has a type, which defines the range of values that can be stored in the variable.

Operations

An operation is a feature that represents a behavior that objects possess. The operations defined for a type form an interface that can be seen by users of objects of that type. An operation can have parameters that identify information a caller must provide when invoking the operation. If an operation has no parameters, a caller merely invokes the operation for the desired object.

Methods

Each operation must be implemented by a module of code called a method. A method is the steps performed to complete an operation.

Referring now to FIG. 1, a block diagram illustrates the flow of information through a compiler 20 running in a computer system 21. One or more source files 22 are provided as an input to the compiler 20 whereupon they are parsed to generate objects 23 through 27 representing program elements. The objects 23–27 are then converted by the compiler to objects 30 through 34, which represent machine instructions. The machine instructions are then stored in a binary file 36. In accordance with the present invention, the binary file 36 includes table mapping instructions to source locations.

The compiler 20, which has been programmed using objects, must relate its objects (representing a program being compiled) to locations within the source files 22. The parsing phase of compilation creates objects representing program elements, such as functions 23, statements 24 and expressions 25–27. A source location of one of these objects is generally shown as a source file name and a line number within the named source file. The code generation phase of compilation involves generating machine instruction objects for the program element objects. The source location of a machine instruction object is generally the same as the source location of the statement or expression for which the machine instruction was generated.

The compiler 20 uses the source locations of its objects in at least two cases. First, the compiler shows a source location when issuing a diagnostic message to inform the compiler's user of an error location. Secondly, the compiler puts a table in the binary file along with the machine instructions in order to map the instructions to their corresponding source locations. This table is used for debugging when the machine instructions are loaded from the binary file into a computer system's memory and executed. When processing is interrupted, a debugger or other diagnostic software can use the table to find the source location or inlined partial call history that relates to the current point of execution of machine instructions and can find the same information for each call instruction in the series of calls that arrived at the interrupted instruction in order to show a complete call history.

For a compiler to use this invention, it must include and use the type Src (a source location or inlined call history), which is amplified hereinbelow. Other types, also amplified below, are used internally within the invention.

A compiler uses the type alluded to above at various stages of compilation as follows. First, source files and their ranges of line numbers are registered for the Src type. Then, as each language element is parsed, a Src object is created for its source location. Compiler objects, such as those for declarations, statements, expressions, and so on, must have an instance variable of type Src by which they are related to their respective source locations. Whenever one of these objects is created, it must pick up the Src. During processing of each compiler object, if new objects are to be created to replace or augment the object, the original Src must be propagated into the new objects.

If functions are inlined by the compiler, then objects copied from a function being inlined into the place of a call on the function use a special construction of Src which combines the Src of the call and the Src of the object being copied. The copied object then has a Src representing an inlined call history. Note that either or both of the two Src objects used by the construction can already be inlined call histories.

As machine instruction objects are generated for each compiler object, such as a statement or expression, the compiler object's Src must be copied into the machine instruction object. Machine instruction objects also have an instance variable of type Src.

The following types are defined by the method of the present invention:

1. An object type, Src, identifies a source location, and where inlining has occurred, a list of inlined source locations. Src objects are small so they can be present in the many objects used within a compiler without a substantial overhead in memory usage. An object of type Src has one instance variable, an integer. The Src type supports the following operations.

a. construction of a null Src;
   b. construction of a Src from an integer offset into the source lines of a compilation unit;
   c. construction of a Src as a copy of another Src;
   d. construction of an inlined Src from a first Src being inlined at a second Src, either of which can also represent inlined source locations such that inlining can occur in any order and to any depth;
   e. an operation to establish a base offset for a compilation unit, which must be called when starting to construct Src objects for a new compilation unit or when changing to a previous compilation unit (this operation takes one optional argument, which if given, must be a base previously returned by a call on this same operation- Otherwise, a new base is established- this operation returns the base offset); and,
   f. an operation to define a range of integer offsets into the source lines of a compilation unit belonging to a single source file. (The arguments for this operation are (1) a source file name, (2) a first line number within the source file of this range, (3) the starting offset of the range within the source lines of the compilation unit from the base established by the last call to e. above, and (4) the ending offset of the range. This operation must be called in order of ascending ranges with no overlapping ranges).

2. An object type, SrcRange, contains information about a range of source lines. Several different Src objects can all correspond to the same SrcRange. SrcRange objects are stored in fine tables which can be located by traversing one or more coarse tables.

A SrcRange object has six instance variables. The first two, called myFirstX and myLastX, contain the first and last index for the range. The third, called myRangeType, determines whether the range is a simple source range or a compound inline range. The remaining three instance variables take on different meanings depending on the value of myRangeType. If the range is a simple source range, the three remaining instance variables hold the source file name, the object file name, and the first line number for the range. Otherwise, the range is a compound inline range and the three remaining instance variables hold the source index for the call, the source index for the line of the inline function definition corresponding to myFirstX, and the inlined function identifier.

The SrcRange type supports the following operations:
a. construction of a null SrcRange;
b. construction of a simple SrcRange from a first and last source index, an object file name, a source file name, and the line number corresponding to the first source index;
c. construction of an inline SrcRange from a first and last source index, the source index of the function call, a source index from the inline function definition, and the function identifier;
d. an accessor for the first line number of a simple source range;
e. an accessor for the first index of a source range;
f. a method for assigning the first index of a source range;
g. an accessor for the first index of the function call of an inline source range;
h. an accessor for the first index of the inlined function definition corresponding to the first index of an inline source range;
i. an accessor for the function identifier of an inline source range;
j. an accessor for the last index of a source range;
k. a method for assigning the last index of a source range;
l. an accessor for the object file name of a simple source range;
m. an accessor for the type of a source range; and,
n. an accessor for the source file name of a simple source range.

3. An object type, SrcFineTbl, implements methods for maintaining a table of SrcRange objects. A SrcFineTbl object has three instance variables. The first instance variable, called myLastX, gives the index of the last SrcRange object in the table. The second instance variable, called myCurrentX, keeps track of the most recently accessed SrcRange object in the table and is used to optimize consecutive accesses to the same SrcRange object. The last instance variable, called myFineTbl, stores the source range objects in this fine table.

The SrcFineTbl type provides the following operations:
a. construction of an empty fine table;
b. a method for adjusting the last inlined SrcRange object to include a new inlined Src object if they are both inlining the same function at the same source index;
c. a method for searching a fine table for a given source index. If found, a pointer to the SrcRange object containing the source index is returned, otherwise, the null pointer is returned;
d. a method for creating a new SrcRange object in a fine table. If space is available in the table, a pointer to the new SrcRange object is returned, otherwise, the null pointer is returned;

4. An object type, SrcTblRange, contains information about either a SrcFineTbl object or a SrcCoarseTbl object. A SrcTblRange object has four instance variables. The first two, called myFirstX and myLastX, contain the first and last source index used in the table referred to by this range. The third, called myTblRangeType, determines whether the range is for a fine table or a coarse table. The remaining instance variable takes on a different meaning depending on the value of myTblRangeType. If the range is for a fine table, the remaining instance variable is a pointer to the fine table. Otherwise, the range is for a coarse table and the remaining instance variable is a pointer to the coarse table.

The SrcTblRange type supplies the following operations.
a. construction of an empty range;
b. construction of a range for a fine table;
c. construction of a range for a coarse table;
d. an accessor for the first index of a table range;
e. a method for assigning the first index of a table range;
f. an accessor for the last index of a table range;and,
g. a method for assigning the last index of a table range.

5. An object type, SrcCoarseTbl, implements methods for maintaining a table of SrcTblRange objects. A SrcCoarseTbl object has four instance variables. The first instance variable, called myLastX, gives the index of the last SrcTblRange object in the table. The second instance variable, called myCurrentX, keeps track of the most recently accessed SrcTblRange object in the table and is used to optimize consecutive accesses to the same SrcTblRange object. The third instance variable, called myCoarseLvl, contains the number of coarse levels below this coarse table. The last instance variable, called myCoarseTbl, stores the table range objects in this coarse table.

The SrcCourseTbl type provides the following operations:
a. construction of an empty coarse table;
b. construction of a parent coarse table to the given coarse table;
c. a method for adjusting the last inlined SrcRange object to include a new inlined Src object if they are both inlining the same function at the same source index;
d. a method for searching a coarse table for a given source index. If found, a pointer to the SrcRange object containing the source index is returned, otherwise, the null pointer is returned; and,
e. a method for creating a new SrcRange object in a coarse table. If space is available in the table, a pointer to the new SrcRange object is returned, otherwise, the null pointer is returned.

An example source program consisting of two source files, FILE1 and FILE2, is set forth below:

| LINE NO. | FILE1 |
|---|---|
| 1 | int f(int x) |
| 2 | {return 10 / x;} |

| LINE NO. | FILE2 |
|---|---|
| 1 | #include "FILE1" |
| 2 | int main ( ) |
| 3 | {int a, b; |
| 4 | a = f(10); |
| 5 | b = f(0); |
| 6 | return a + b;} |

EXAMPLE

Execution of the binary program resulting from compiling the files set forth in the EXAMPLE above with a C compiler is interrupted in the function f in FILE 1 at line 2 when the machine instruction doing a divide operation tries to divide by zero. That is, the call history is (FILE1, line 2), (FILE2, line 5). The second source location in the call history is the place where the function f is called when it is interrupted.

In the EXAMPLE illustrated and explained above, if the function f is inlined, then there is no call instruction from which to determine a call history if the prior art multipass compiler is used. For call histories to be properly determined for inlined functions, the tables in the binary file must include portions of call histories in place of mere source locations. Using the present invention, the inlined divide operation for the first call on the function f is mapped to the call history (FILE1, line 2), (FILE2, line 4), and the inlined divide operation for the second call is mapped to the call history (FILE1, line 2), (FILE2, line 5). Having call histories for inlined functions stored in the binary file allows a debugging tool or other diagnostic software to show complete call histories.

The tables below show the information mapping machine instructions to source locations that would be stored along with the machine instructions in a binary file for example. Actual machine instructions are not shown. The first column of each table describes in words what would actually be numerical offsets into the stream of machine instructions stored in the binary file.

When the function f is not inlined:

TABLE I

| Index into machine instructions for: | Corresponding source locations |
| --- | --- |
| return 10 / x | FILE2 line 2 |
| Allocation of a and b | FILE1 line 3 |
| call f(10) and assignment to a | FILE1 line 4 |
| call f(0) and assignment to b | FILE1 line 5 |
| return a + b | FILE1 line 6 |

When the function f is inlined:

TABLE II

| Index into machine instructions for: | Corresponding source locations |
| --- | --- |
| Allocation of a and b | FILE1 line 3 |
| 10 / 10 | FILE2 line 2, FILE1 line 4 |
| assignment to a | FILE1 line 4 |
| 10 / 0 | FILE2 line 2, FILE1 line 5 |
| assignment to b | FILE1 line 5 |
| return a + b | FILE1 line 6 |

Both tables allow a debugging tool or other diagnostic software to provide the same correct call history, using the call instruction in TABLE I, and the inlined call history in TABLE II.

Referring now to FIG. 2A, a Source Coarse Table is shown that corresponds to the source files illustrated in the EXAMPLE above when the function f is not inlined. A Source Fine Table is shown in FIG. 2B that corresponds to the source files illustrated in the EXAMPLE when the function f is not inlined. FIG. 2C illustrates a Source Coarse Table that corresponds to the source files illustrated in the EXAMPLE when the function f is inlined. FIG. 2D illustrates a Source Fine Table that corresponds to the source files illustrated in the EXAMPLE when the function is inlined. It is noted that the Source Coarse and Fine Tables illustrated in FIGS. 2A through 2D are stored in the compiler 20 and are an intermediate form of the source information that allows one to build tables (e.g., TABLES I and II, above) in the binary file.

Again referring to FIG. 2A, the illustrated Source Coarse Table object shown is the root source table. A Source Coarse Table object contains four instance variables. For the Source Coarse Table object shown in FIG. 2A, the first instance variable, my last index ("myLastX"), has a value of zero, which indicates that the last used index in my coarse table is zero. The second instance variable, my current index ("myCurrentX"), has a value of zero and is used to optimize repeated inquires on the same element in my coarse table. The third instance variable, my coarse level ("myCoarseLvl"), has a value of zero, which indicates that there are only Source Fine Table objects contained in my coarse table. Finally, the fourth instance variable, my coarse table ("myCoarseTbl"), is the table containing Source Table Range objects.

In this particular coarse table there is only one Source Table Range object currently in use. A Source Table Range object contains four instance variables. For the Source Table Range object shown in FIG. 2A, the first and second instance variables, my first index and my last index, have the values one and eight, respectively, giving a total of eight source indexes, which corresponds to the total number of source lines in FILE1 and FILE2 from the EXAMPLE. The third instance variable, my table range type ("myTblRangeType"), has a value that indicates this Source Table Range object points to a Source Fine Table object. Finally, the fourth instance variable, my source table pointer ("mySrcTablePtr"), points to the Source Fine Table object labeled (F1) shown in FIG. 2B.

Referring now to FIG. 2B, the Source Fine Table object shown is labeled (F1). A Source Fine Table object contains three instance variables. For this Source Fine Table object, the first instance variable, my last index ("myLastX"), has a value of two, which indicates that the last used index in my fine table is two. The second instance variable, my current index ("myCurrentX"), has a value of zero and is used to optimize repeated inquires on the same element in my fine table. Finally, the third instance variable, my fine table ("myFineTbl"), is the table containing Source Range objects.

In this particular fine table there are three Source Range objects currently in use. A Source Range object contains six instance variables. For the Source Range objects shown in FIG. 2B, the first and second instance variables, my first index and my last index, have values that break the source files, FILE1 and FILE2, into contiguous ranges that correspond to the order in which they are scanned during the compilation process. The three Source Range objects in FIG. 2B have a total of eight source indexes that corresponds to the total number of source lines in FILE1 and FILE2 from the EXAMPLE, and also to the number of source indexes in the Source Table Range object shown in the Source Coarse Table object in FIG. 2A.

The third instance variable, my range type ("myRangeType"), has a value of simple for all three Source Range objects in my fine table, which indicates hat these Source Range objects refer to ordinary source lines and not to source lines that have been inlined from one source location to another. Finally, the fourth, fifth and sixth instance variables, my source file name ("mySrcFileName"), my object file name ("myObjFileName") and my line number ("myLineNum"), respectively, contain information about the source range. That is, the source file name that contains the source range, the object file that stores the binary code (if any) for this source range and the line number form the source file that corresponds to the value of my first index.

Referring now to FIGS. 2C and 2D, a Source Coarse Table object and a Source Fine Table object are shown. These objects correspond to the sources files shown in the EXAMPLE just as did the objects from FIGS. 2A and 2B described above, except for one difference. These objects reflect how additional source information is stored when the function f of the EXAMPLE is inlined. In FIG. 2C, the Source Table Range object in the Source Coarse Table object has a value of twelve for my last index instead of eight as shown in FIG. 2A. This increase indicates that there is additional source range information in the Source Fine Table object in FIG. 2D.

Referring again to FIG. 2D, the Source Fine Table object shown contains two additional Source Range objects at elements three and four in my fine table as compared to the Source Fine Table object shown in FIG. 2B. The value of my range type for these two Source Range objects is inlined. The last three instance variables of an inlined source range provide the source index of the function call, the source index of the beginning of the function definition and the function identifier.

Figure 3A:
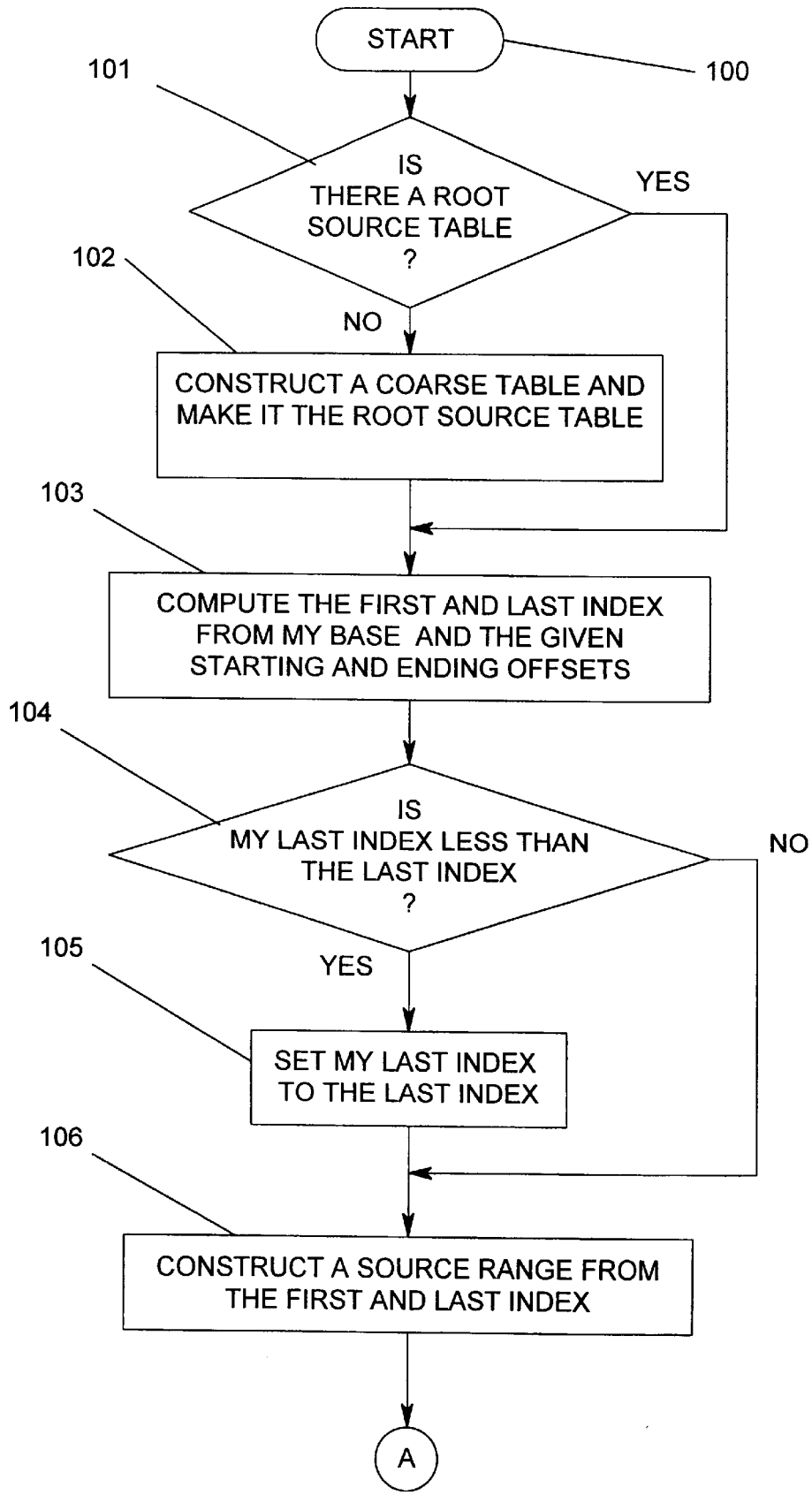
FIGS. 3A and 3B combined form a flow chart of the process for defining a source range from starting and ending offsets in a source file.
Figure 3B:
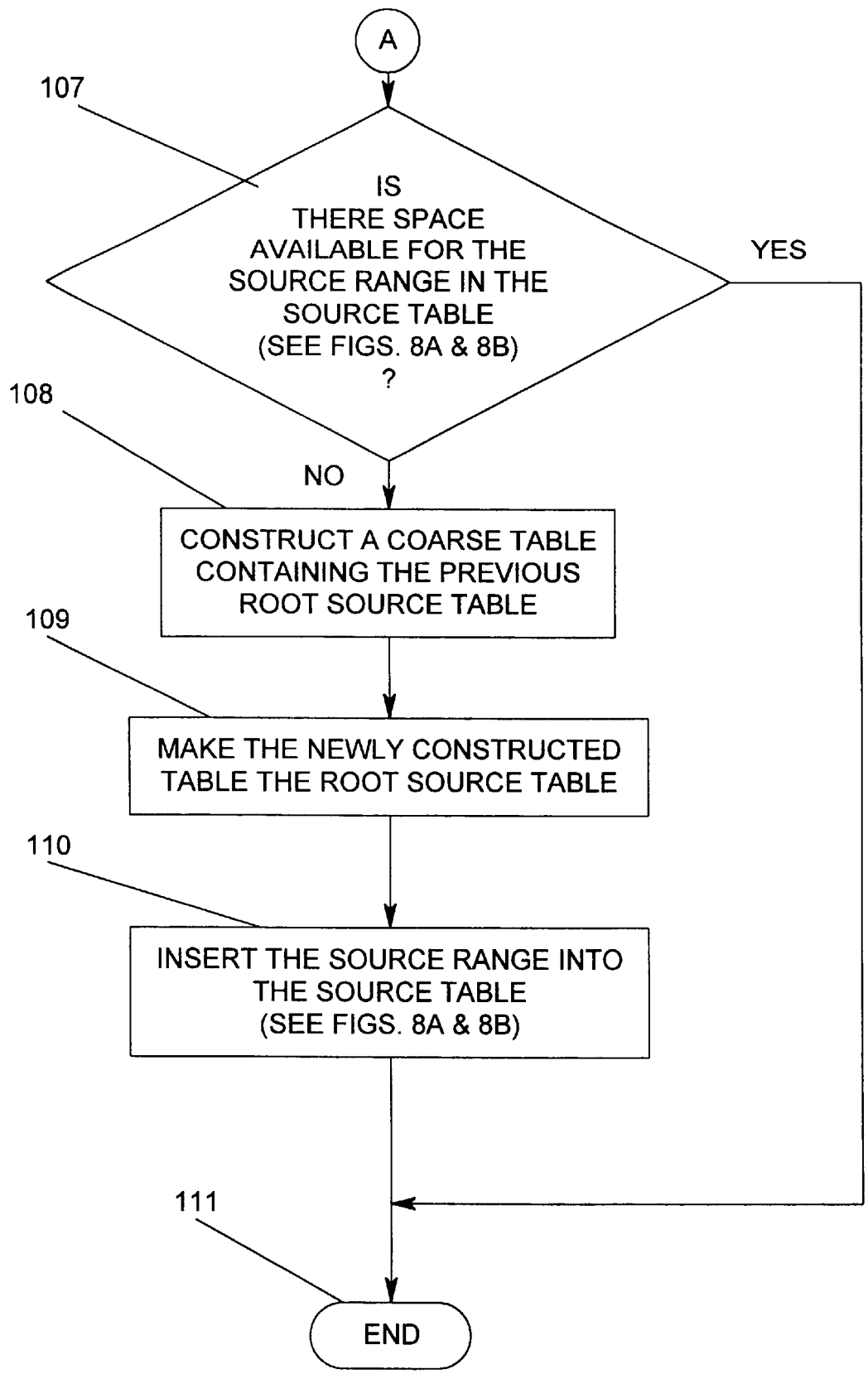

Referring now to FIGS. 3A and 3B, a combined flow chart of the method for defining a Source Range object from beginning and ending source file offsets is illustrated. The process begins with a start bubble 100 followed by an inquiry as to whether or not there is a root source table (diamond 101). If the answer to this inquiry is no, then a Source Coarse Table object is constructed and established as the root source table (block 102). On the other hand, if the answer to this inquiry is yes, or upon completion of the step depicted by the block 102, the first and last index is computed from my base and the given starting and ending offsets are computed (block 103).

Another inquiry is next made as to whether or not my last index is less than the previously computed last index (diamond 104). If the answer to this inquiry is yes, then my last index is set to the last index (block 105). On the other hand, if the answer to this inquiry is no, or upon completion of the step depicted by the block 105, a Source Range object is constructed from the previously computed first and last index, the given object file name, and the given source file name (block 106). As a result of the foregoing an object has been created that represents a sequence of lines from a source file being compiled. The process illustration continues in FIG. 3B as denoted by a connector A.

Figure 8A:
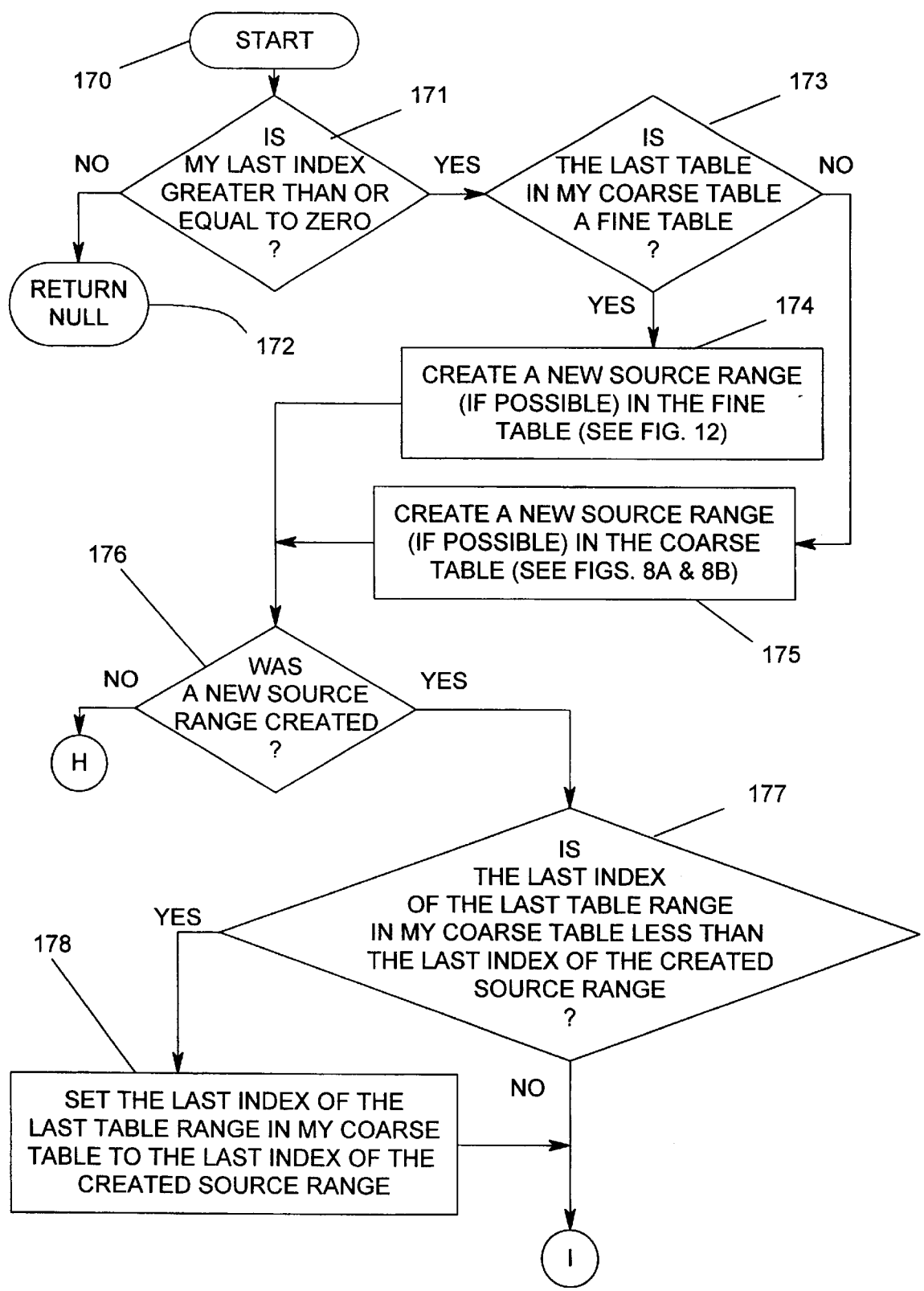
FIGS. 8A and 8B combined form a flow chart of the process for creating a Source Range object from a Source Coarse Table object.
Figure 8B:
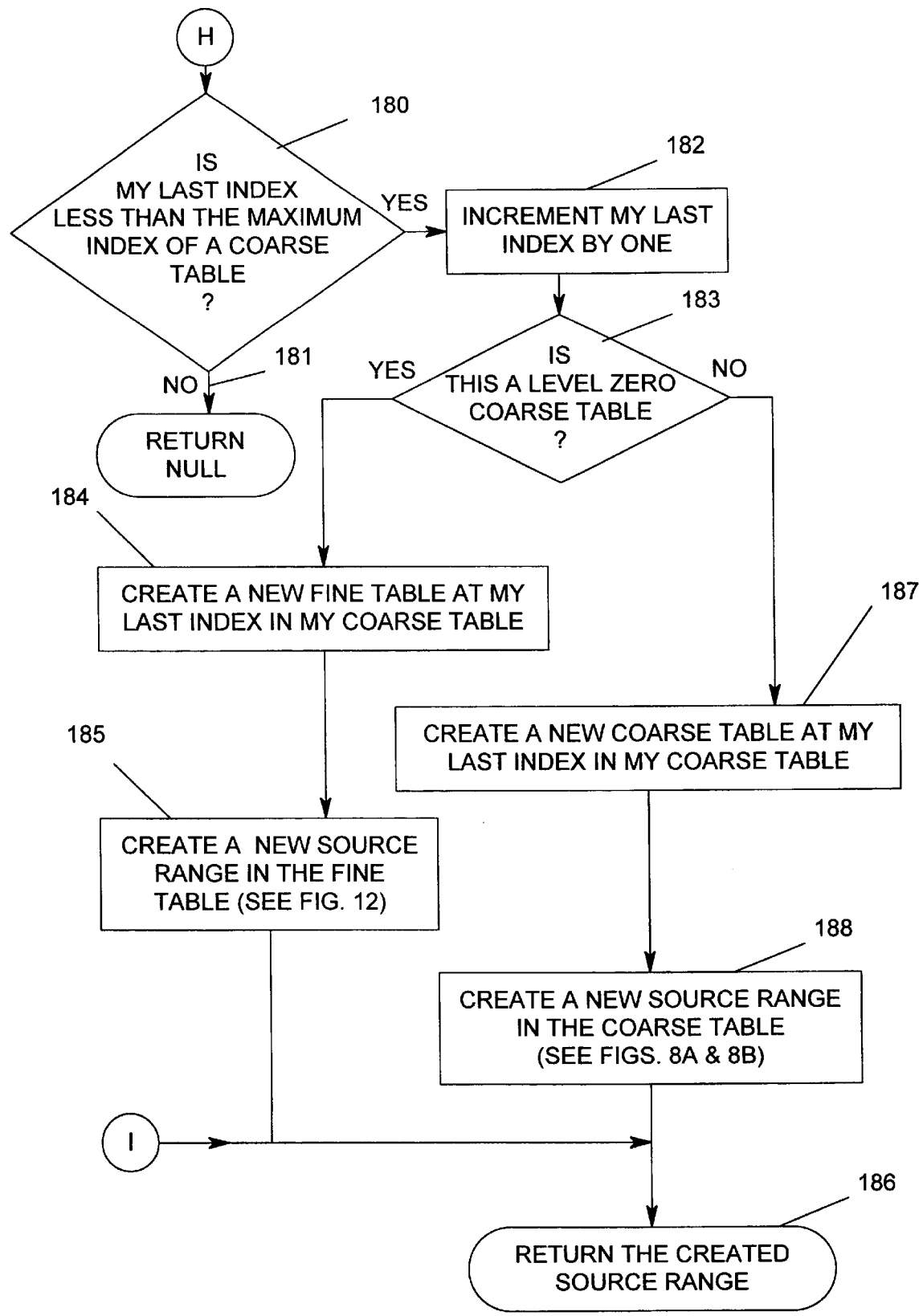

Referring to FIG. 3B at the connector A, an inquiry is made as to whether or not there is space available for the Source Range object in the source table (diamond 107, see FIGS. 8A and 8B, described hereafter). If the answer to this inquiry is no, then a Source Coarse Table object is constructed containing the previous root source table (block 108). Next, the newly constructed table is made the root source table (block 109). Following this, the Source Range object is inserted into the source table (block 110, see FIGS. 9A and 8B). Upon completion of this step, or if the answer to the inquiry in the diamond 108 is yes, a branch is taken to the end (bubble 111). Accordingly, the source table now contains the object that represents the given sequence of lines from a source file being compiled.

Figure 4:
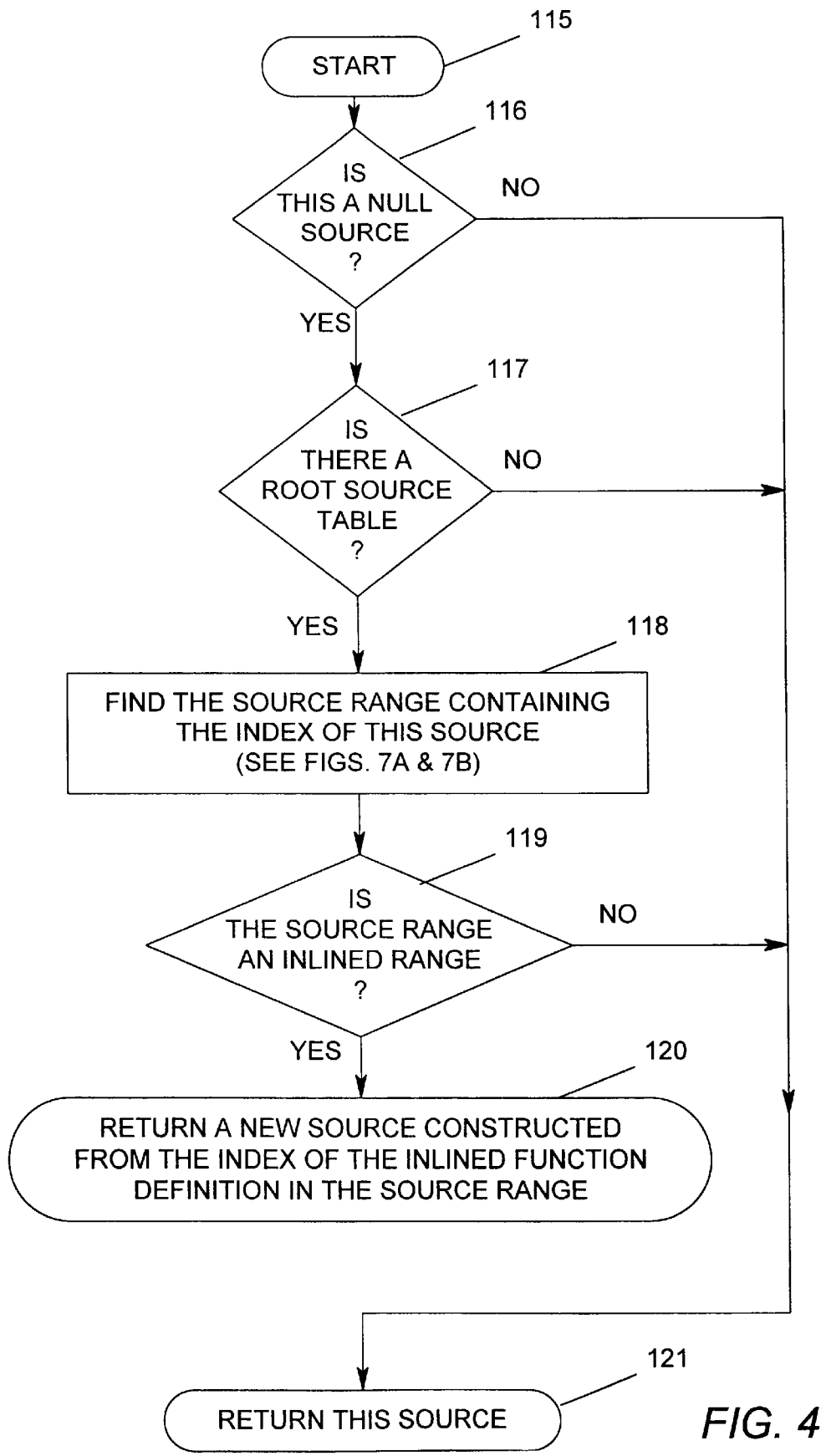
FIG. 4 is a flow chart of the process for determining the primary Source object of a Source object.

Referring now to FIG. 4, the process for determining the primary Source of a Source object is illustrated. The process begins with a start bubble 115, followed by an inquiry as to whether or not this is a null Source object (diamond 116). If the answer to this inquiry is no, then another inquiry is made as to whether or not there is a root source table (diamond 117). If the answer to this inquiry is yes, then the process finds the Source Range object containing the index of this Source object (block 118, see FIGS. 7A and 73). Next, still another inquiry is made as to whether or not the Source Range object is an inlined range (diamond 119). If the answer to this inquiry is yes, then a new Source object is returned which is constructed from the index of the inlined function definition in the Source Range object (bubble 120).

If the answer to the inquiry depicted by the diamond 116 is yes, or if the answer to the inquiries in the diamonds 117 or 119 is no, then this Source object is returned (bubble 121).

Figure 5A:
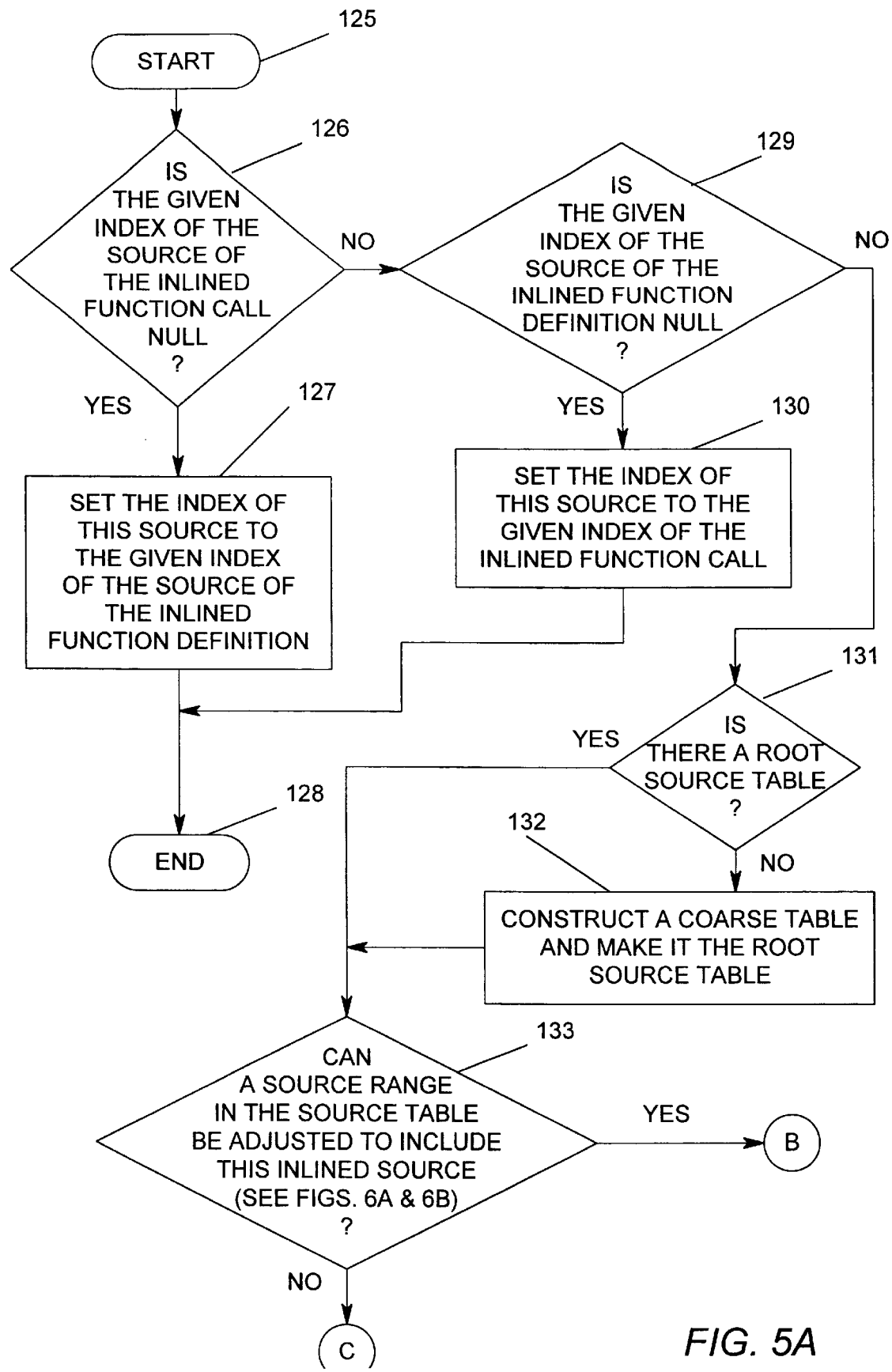
FIGS. 5A and 5B combined form a flow chart of the process for constructing an inlined Source object.
Figure 5B:
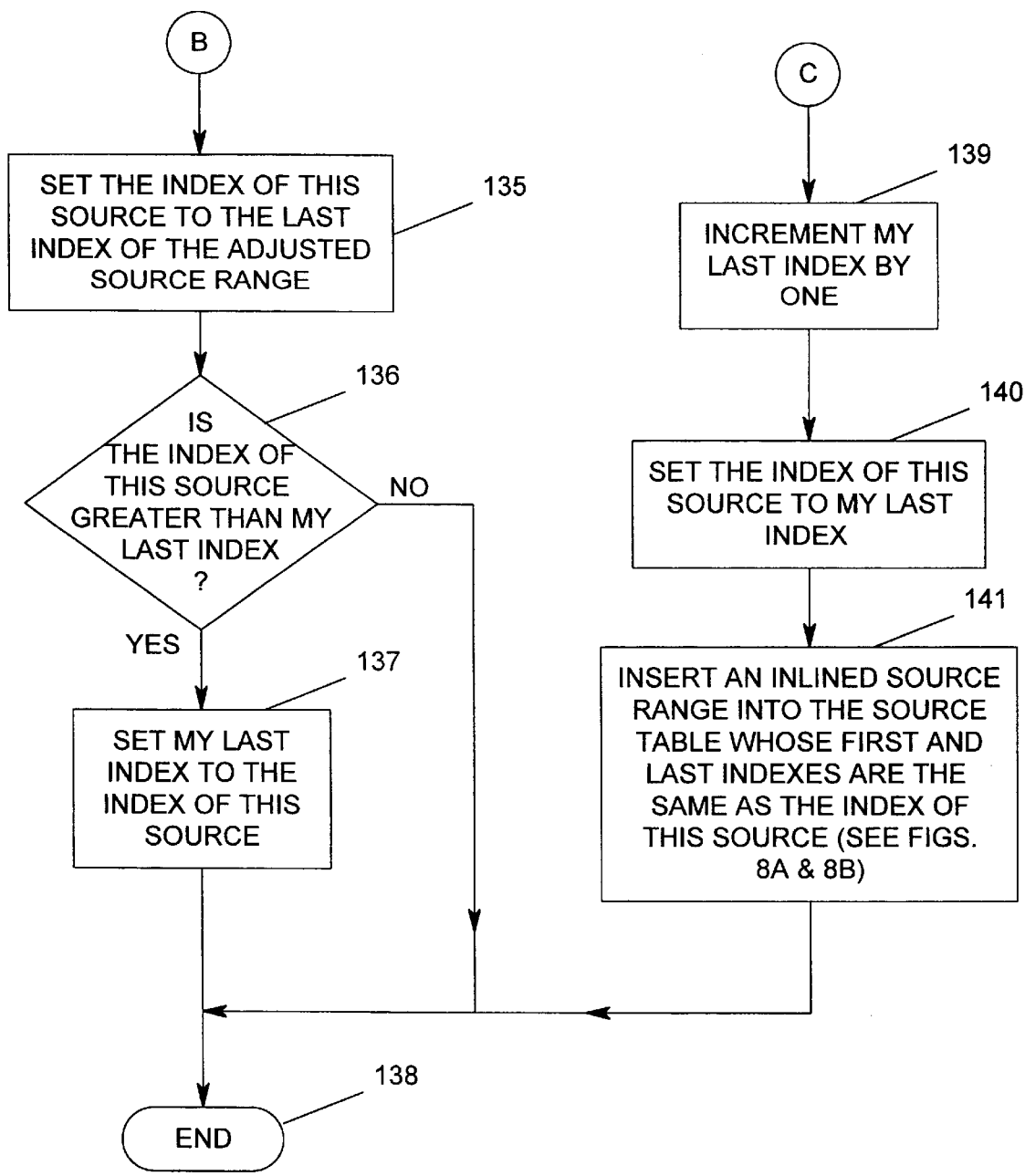

Referring now to FIGS. 5A and 5B, a process for constructing an inlined Source object is illustrated. The process begins with a start bubble 125 followed by an inquiry as to whether or not the given index of the Source object of the inlined function call is null (diamond 126). If the answer to this inquiry is yes, then the index of this Source object is set to the given index of the inlined function definition as depicted by a block 127. After this the process ends (bubble 128).

If the answer to the inquiry depicted by the diamond 126 is no, then another inquiry is made as to whether or not the given index of the Source object of the inlined function definition is null (diamond 129). If the answer to this inquiry is yes, then the index of this Source object is set to the index of the Source Object of the inlined function call as depicted by a block 130, after which the process ends (bubble 128). On the other hand, if the answer to the inquiry in the diamond 129 is no, then still another inquiry is made as to whether or not there is a root source table (diamond 131). If the answer to this inquiry is no, then the a Source Coarse Table object is constructed and made the root source table (block 132). On the other hand, if the answer to this inquiry is yes, or upon completion of the step depicted by the block 132, yet another inquiry is made as to whether or not a Source Range object in the source table can be adjusted to include this inlined Source object (diamond 133, see FIGS. 6A & 6B). The process illustration continues in FIG. 5B as denoted by a connector B if the answer to the inquiry depicted by the diamond 133 is yes, or by a connector C if the answer is no.

Referring now to FIG. 5B at the connector B, the index of this Source object is set to the last index of the adjusted Source Range object (block 135). Next, an inquiry is made as to whether or not the index of this Source object is greater than my last index (diamond 136). If the answer to this inquiry is yes, then my last index is set to the index of this Source object (block 137). Following this, the process ends (bubble 138).

Referring back to the connector C from FIG. 5A, my last index is incremented by one (block 139). Next, the index of this Source object is set to my last index (block 140). Then, an inlined Source Range object is inserted into the source table whose first and last indexes are the same as the index of this Source object (block 141, see FIGS. 8A and 8B). The process ends at the bubble 138.

Figure 6A:
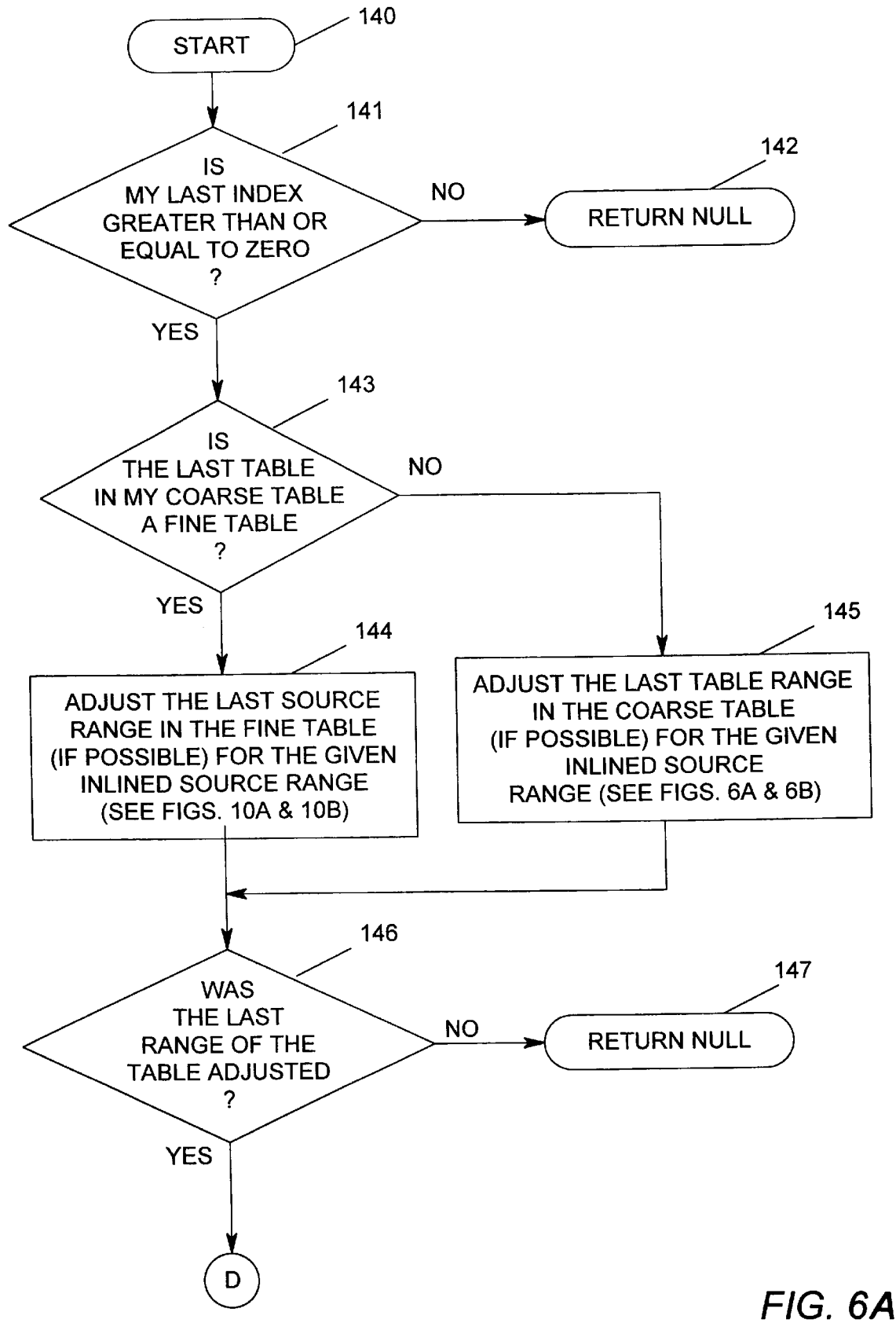
FIGS. 6A and 6B combined form a flow chart illustrating the process for adjusting a Source Range object from a Source Coarse Table object.
Figure 6B:
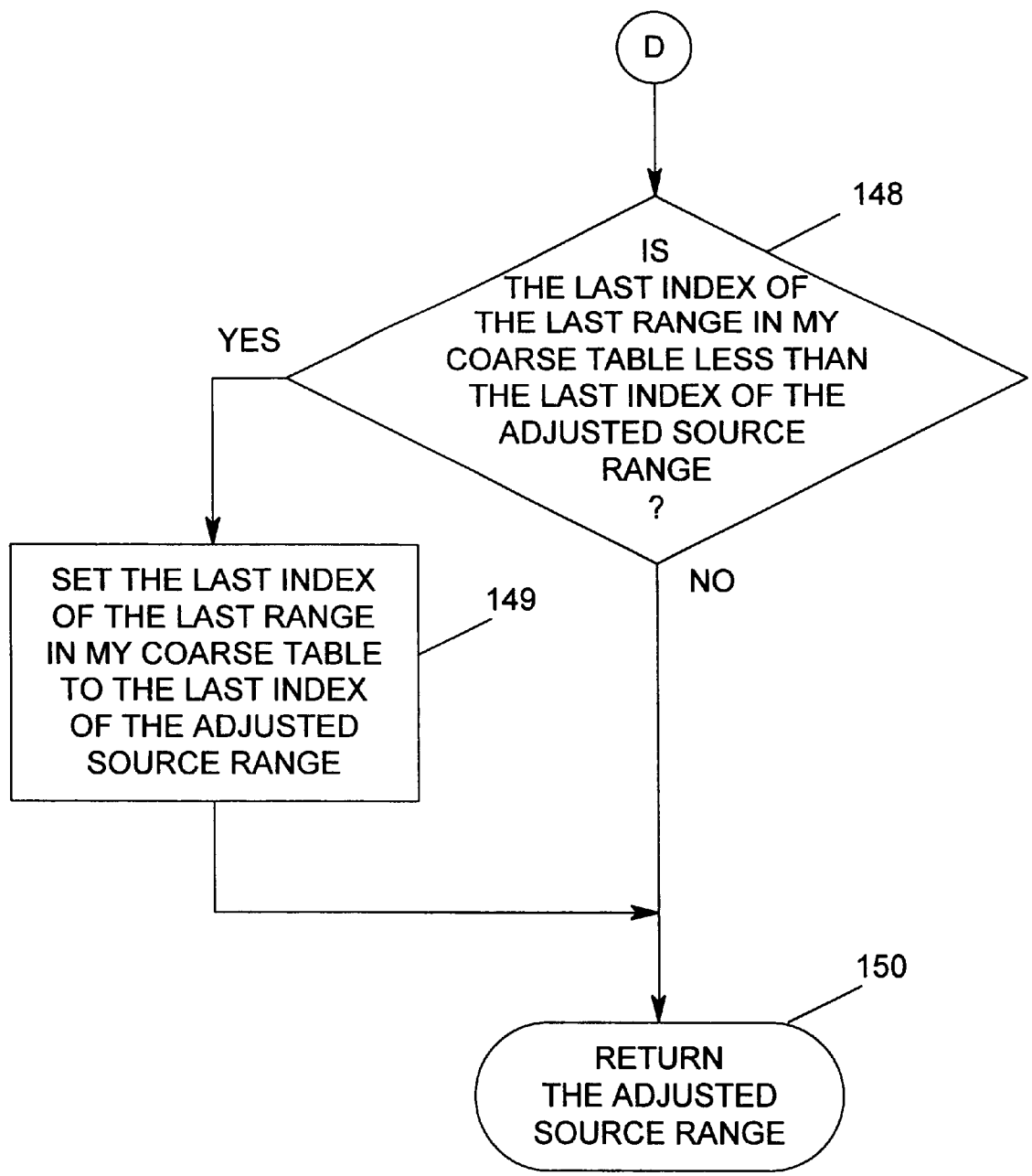

Referring now to FIGS. 6A and 6B, a flow chart illustrating the process for adjusting a Source Range object from a Source Coarse Table ("SrcCoarseTbl") object is shown. The process begins with a start bubble 140 followed by an inquiry as to whether or not my last index is greater than or equal to zero (diamond 141). If the answer to this inquiry is no, then null is returned (bubble 142). On the other hand, if the answer is yes, then another inquiry is made as to whether or not the last table in my coarse table is a fine table (diamond 143). If the answer to this inquiry is yes, then the last Source Range object in the fine table is adjusted (if possible) for the given inlined Source Range object (block 144, see FIGS. 10A and 10B).

If the answer to the inquiry depicted by the diamond 143 is no, then the last Table Range object in the coarse table is adjusted (if possible) for the given inlined Source Range object (block 145, see FIGS. 6A and 6B). Upon completion of either the step depicted by the block 144 or the block 145, another inquiry is made as to whether or not the last range of the table was adjusted (diamond 146). If the answer to this inquiry is no, then a return of null is made (bubble 147). On the other hand, if the answer is yes, then a branch of the illustration of the process is continued in FIG. 6B as depicted by a connector D.

Referring now to FIG. 6B at the connector D, still another inquiry is made as to whether or not the last index of the last Source Range object in my coarse table is less than the last index of the adjusted Source Range object (diamond 148). If the answer to this inquiry is yes, then the last index of the last Source Range object in my coarse table is set to the last index of the adjusted Source Range object (block 149). On the other hand, if the answer to this inquiry is no, or upon completion of the process step depicted by the block 149, the adjusted Source Range object is returned (bubble 150).

Figure 7A:
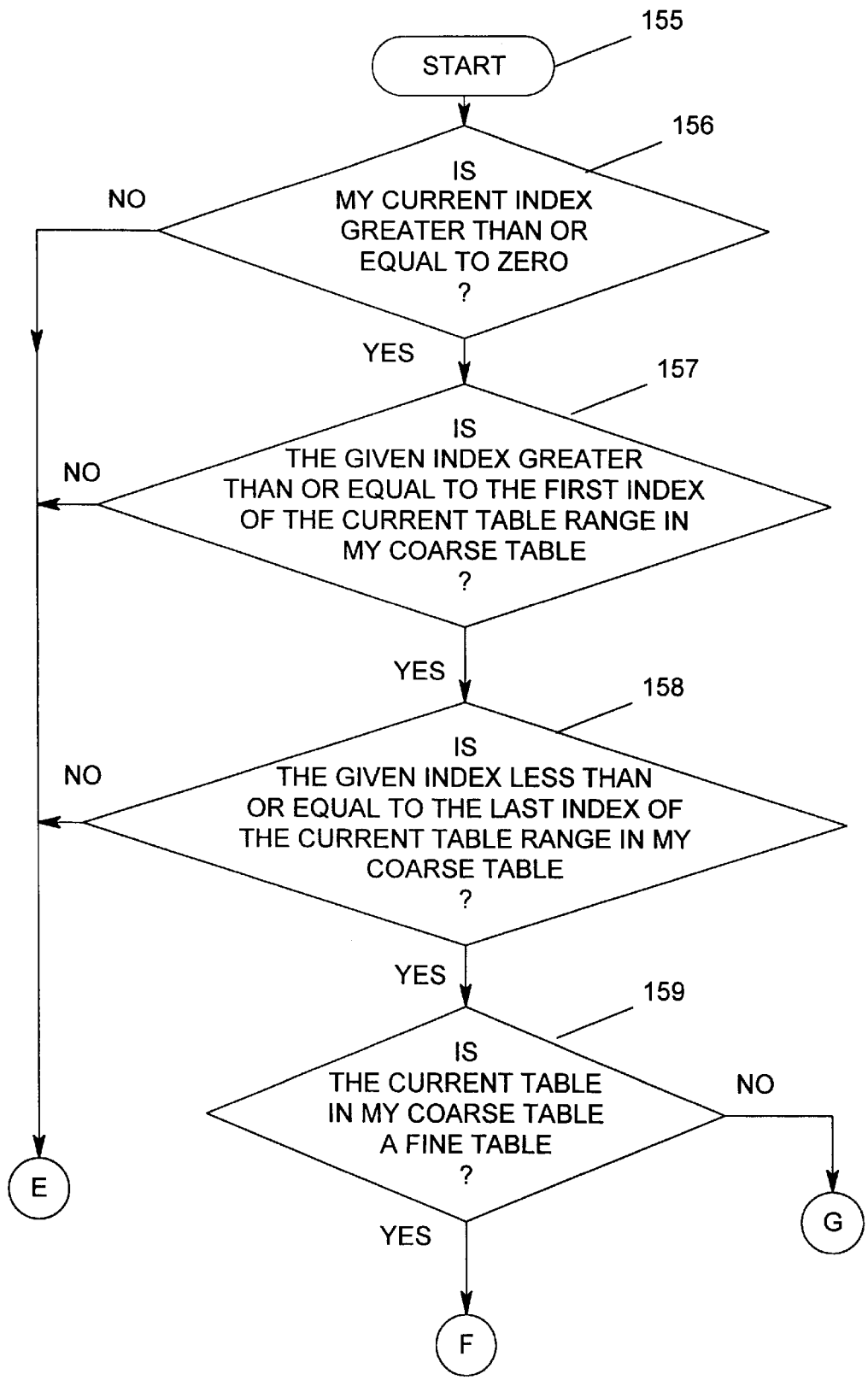
FIGS. 7A and 7B combined form a flow chart of the process for finding a Source Range object from a Source Coarse Table object.
Figure 7B:
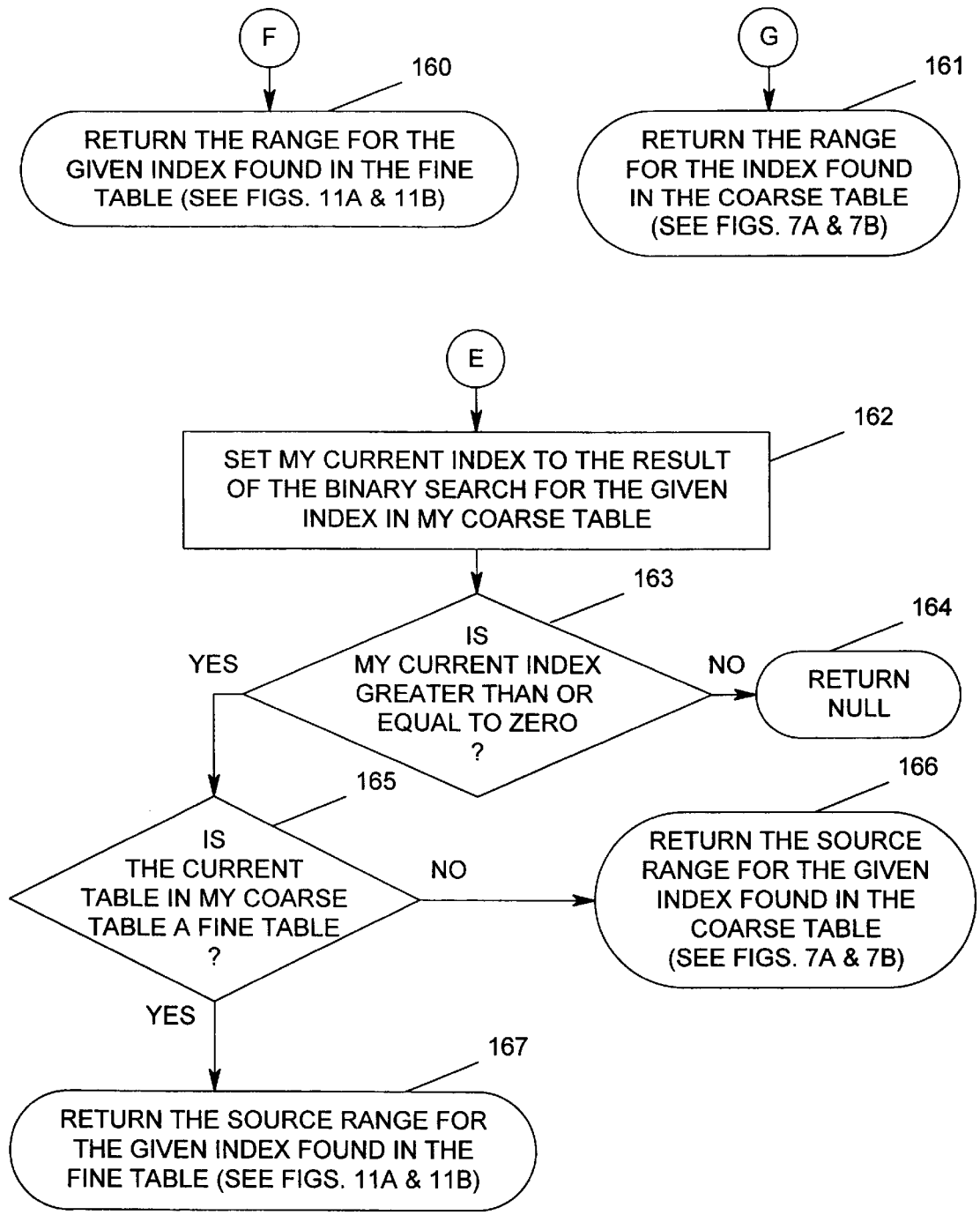

Referring now to FIGS. 7A and 7B, a flow chart of the process for finding a Source Range object from a Source Coarse Table object is illustrated. The process begins with a start bubble 155 followed by an inquiry as to whether or not my current index is greater than or equal to zero (diamond 156). If the answer to this inquiry is yes, then another inquiry is made as to whether or not the given index is greater than or equal to the first index of the current Table Range object in my coarse table (diamond 157). If the answer to this inquiry is yes, then still another inquiry is made as to whether or not the given index is less than or equal to the last index of the current Table Range object in my coarse table (diamond 158). If the answer to this inquiry is yes, the yet another inquiry is made as to whether or not the current table in my coarse table is a fine table (diamond 159). If the answer to the inquiries depicted by the diamonds 156–158 is no then a branch is taken to FIG. 7B as depicted by a connector E. If the answer to the inquiry depicted by the diamond 159 is yes, a branch is taken to FIG. 7B as denoted by a connector F and if the answer to this inquiry is no, then a branch is taken to FIG. 7B as depicted by a connector G.

Figure 11A:
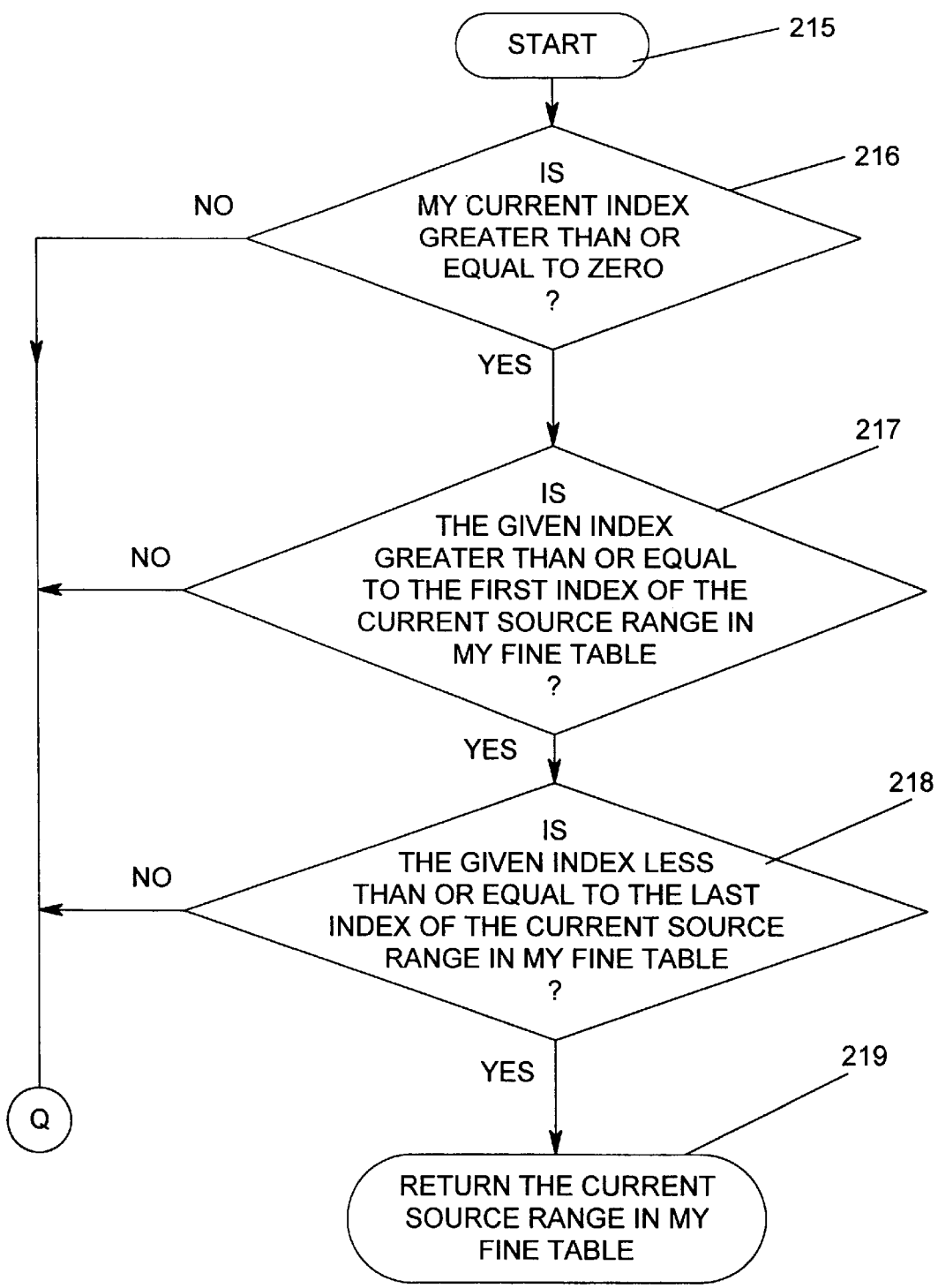
FIGS. 11A and 11B combined form a flow chart of a process for finding a Source Range object from a Source Fine Table object.
Figure 11B:
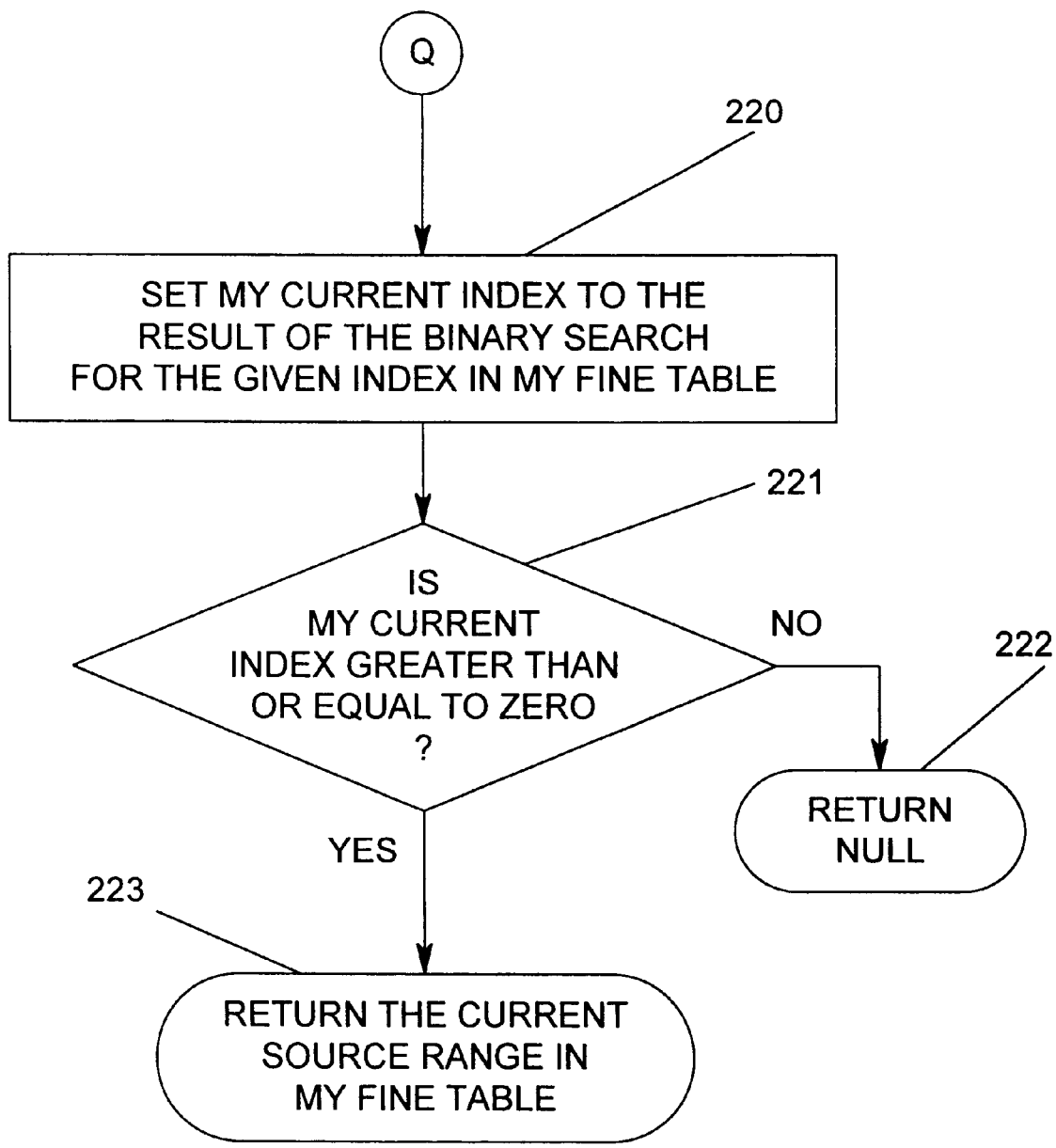

Referring now to FIG. 7B at the connector F, the Source Range object for the given index found in the fine table is returned (bubble 160, see FIGS. 11A and 11B). From the connector G, the Source Range object for the index found in the coarse table is returned (bubble 161, see FIGS. 7A and 7B). From the connector E my current index is set to the result of the binary search for the given index in my coarse table (block 162). Following this, an inquiry is made as to whether or not my current index is greater than or equal to zero (diamond 163). If the answer to this inquiry is no, then null is returned (bubble 164).

If the answer to the inquiry in the diamond 163 is yes, then another inquiry is made as to whether or not the current table in my coarse table is a fine table (diamond 165). If the answer to this inquiry is no, then the Source Range object for the given index found in the coarse table is returned (bubble 166, see FIGS. 7A and 7B). On the other hand, if the answer to the inquiry in the diamond 165 is yes, then the Source Range object for the given index found in the fine table is returned (bubble 167, see FIGS. 11A and 11B).

Referring now to FIGS. 8A and 8B, a flow chart of the process for creating a Source Range object from a Source Coarse Table object is illustrated. The process begins with a start bubble 170 followed by an inquiry as to whether or not my last index is greater than or equal to zero (diamond 171). If the answer to this inquiry is no, then null is returned (bubble 172). If the answer to this inquiry is yes, then another inquiry is made as to whether or not the last table in my coarse table is a fine table (diamond 173). If the answer to this inquiry is yes, then a new Source Range object is created (if possible) in the fine table (block 174, see FIG. 12). On the other hand, if the answer to this inquiry is no, then a new Source Range object is created (if possible) in the coarse table (block 175, see FIGS. 8A and 8B).

Upon completion of the step depicted by either block 174 or 175, yet another inquiry is made as to whether or not a new Source Range object was created (diamond 176). If the answer to this inquiry is no, then a branch is taken to FIG. 8B as depicted by a connector H. On the other hand, if the answer is yes, then still another inquiry is made as to whether or not the last index of the last Table Range object in my coarse table is less than the last index of the created Source Range object (diamond 177). If the answer to this inquiry is no, then a branch is taken to FIG. 8B as depicted by a connector I. On the other hand if the answer to this inquiry is yes, then the last index of the last Table Range object in my coarse table is set to the last index of the created Source Range object (block 178). Upon completion of this step a branch is taken to FIG. 8B via the connector I.

Referring now to FIG. 8B at the connector H, an inquiry is made as to whether or not my last index is less than the maximum index of a coarse table (diamond 180). If the answer to this inquiry is no, the a null is returned (bubble 181). On the other hand, if the answer to this inquiry is yes, then my last index is incremented by one (block 182). Next, another inquiry is made as to whether or not this is a level zero coarse table (diamond 183). If the answer to this inquiry is yes, then a new Source Fine Table object is created at my last index in my coarse table (block 184). Next, a new Source Range object is created in the fine table (block 185, see FIG. 12) Following this, the created Source Range object is returned (bubble 186).

If the answer to the inquiry depicted by the diamond 183 is no, then a new Source Coarse Table is created at my last index in my coarse table (block 187). Next, a new Source Range object is created in the coarse table (block 188, see FIGS. 8A and 8B). Finally, the created Source Range object is returned (block 186). It is pointed out that if the last index of the last table range in my coarse table is not less than the last index of the created source range (no leg of the diamond 177, FIG. 8A, via the connector I), the created source range is returned (bubble 186).

Figure 9:
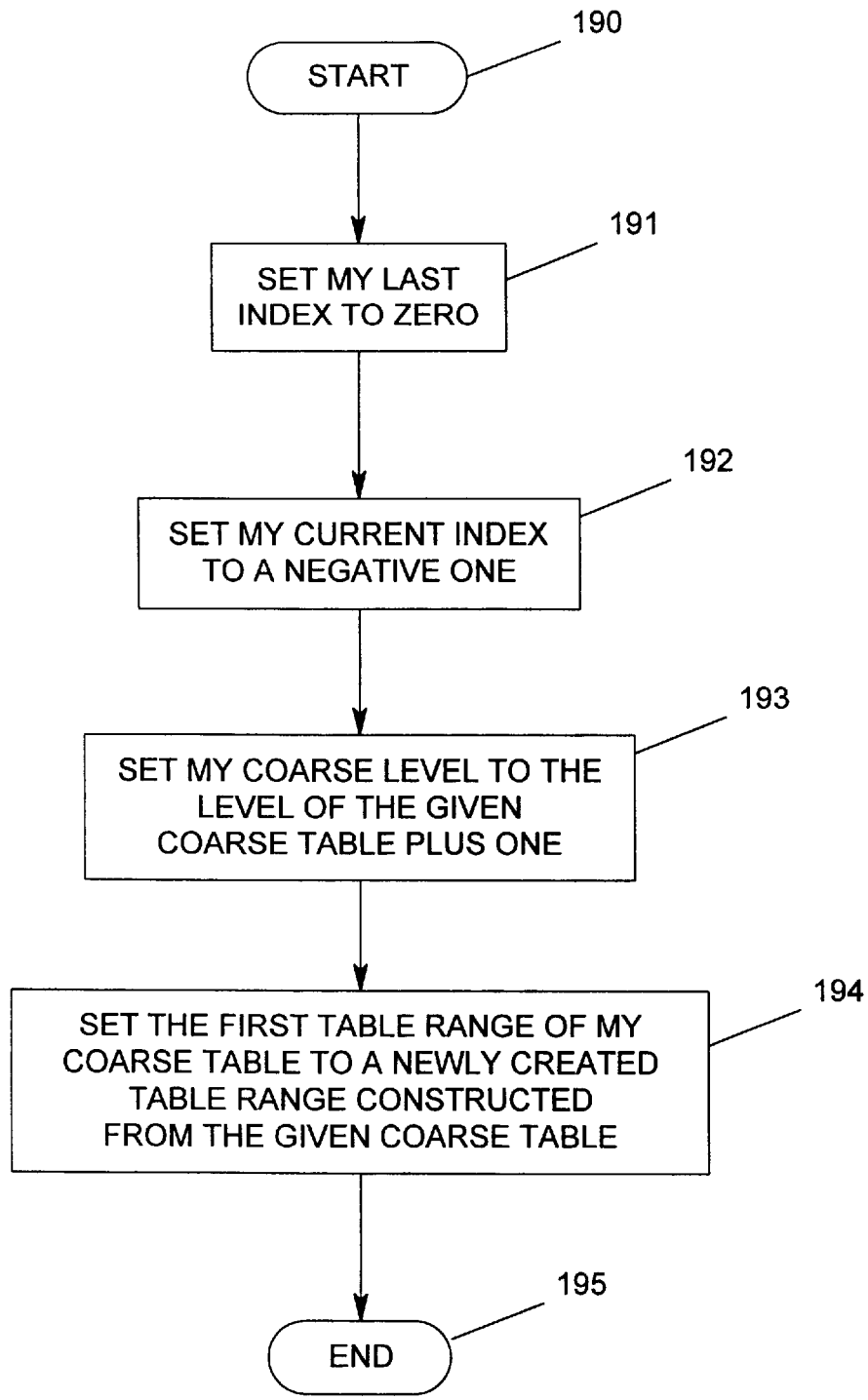
FIG. 9 is a flow chart of the process for constructing a Source Coarse Table object above a given Source Coarse Table object.

Referring now to FIG. 9, a flow chart of the process for constructing a Source Coarse Table object above a given Source Coarse Table object is illustrated. The process begins with a start bubble 190, followed by a process step of setting my last index to zero (block 191). Next, my current index is set to a negative one (block 192), and my coarse level is set to the level of the given Source Coarse Table object plus one (block 193). Following this, the first table range of my coarse table is set to a newly created Table Range object constructed from the given Source Coarse Table object (block 194), whereupon the process ends (bubble 195).

Figure 10A:
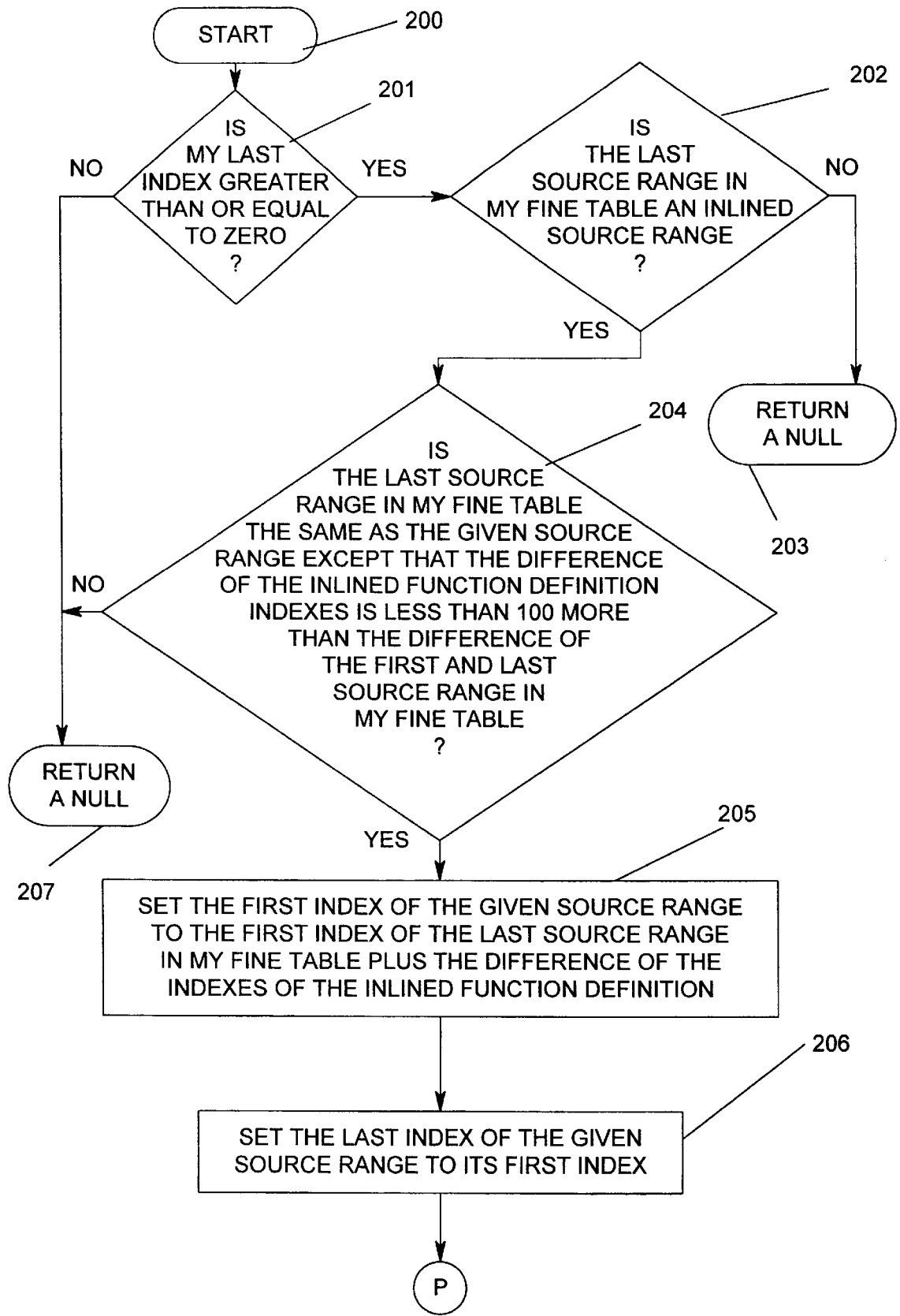
FIGS. 10A and 10B combined form a flow chart of a process for adjusting a Source Range object from a Source Fine Table object.
Figure 10B:
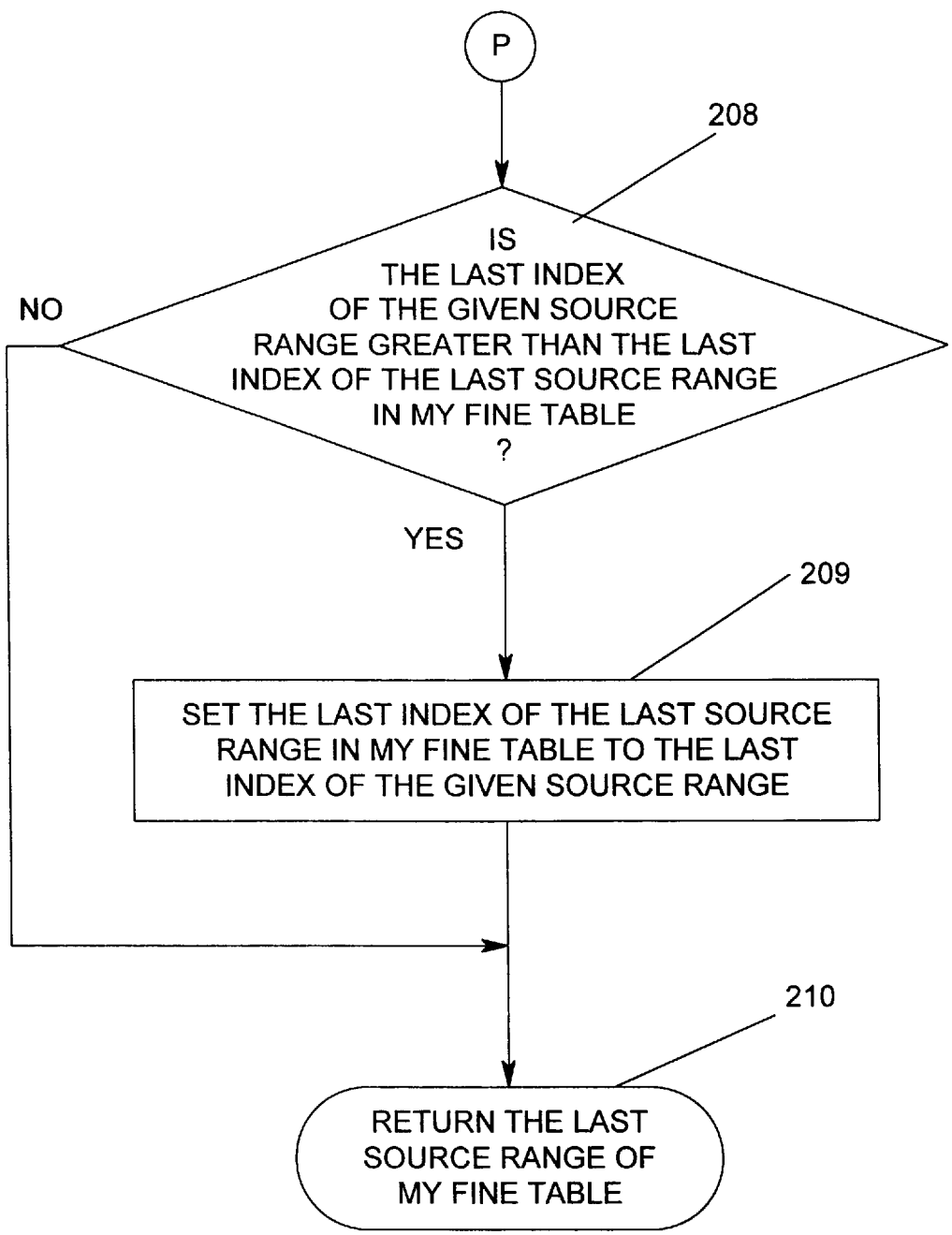

Referring now to FIGS. 10A and 10B, a flow chart of a process for adjusting a Source Range object from a Source Fine Table object is illustrated. The process begins with a start bubble 200 followed by an inquiry as to whether or not my last index is greater than or equal to zero (diamond 201). If the answer to this inquiry is yes, then another inquiry is made as to whether or not the last Source Range object in my fine table is an inlined source range (diamond 202). If the answer to this inquiry is no, then a null is returned (bubble 203). On the other hand, if the answer is yes, then a complex inquiry is made as follows:

Is the last Source Range object in my fine table the same as the given Source Range object except that the difference of the inlined function definition indexes is less than 100 more than the difference of the first and last indexes of the last Source Range object in my fine table (diamond 204).

If the answer to the inquiry in the diamond 204 is yes, then the first index of the given Source Range object is set to the first index of the last Source Range object in my fine table plus the difference of the indexes of the inlined function definition (block 205). Next, the last index of the given Source Range object is set to its first index (block 206). The illustration of the process is continued in FIG. 10B as depicted by a connector P. If the answer to the either of the inquiries depicted by the diamonds 201 or 204 is no, then a null is returned (bubble 207).

Referring now to FIG. 10B at the connector P, another inquiry is made as to whether or not the last index of the given Source Range object is greater than the last index of the last Source Range object in my fine table (diamond 208). If the answer to this inquiry is yes, then the last index of the last Source Range object in my fine table is set to the last index of the given Source Range object (block 209). Next, the last Source Range object of my fine table is returned (bubble 210). If the answer to the inquiry in the diamond 208 is no, then the last Source Range object of my fine table is likewise returned.

Referring now to FIGS. 11A and 11B, a flow chart of a process for finding a Source Range object from a Source Fine Table object is illustrated. The process begins with a start bubble 215 followed by an inquiry as to whether or not my current index is greater than or equal to zero (diamond 216). If the answer to this inquiry is yes, then another inquiry is made as to whether or not the given index is greater than or equal to the first index of the current Source Range object in my fine table (diamond 217). If the answer to this inquiry is yes, then yet another inquiry is made as to whether or not the given index is less than or equal to the last index of the current Source Range object in my fine table (diamond 218). If the answer to this inquiry is yes, then the current Source Range object in my fine table is returned (bubble 219). If the answer to the inquiries depicted by any of the diamonds 216, 217 or 218 is no, then a branch is taken to FIG. 11B as depicted by a connector Q.

Referring now to FIG. 11B at the connector Q, my current index is set to the result of a binary search for the given index in my fine table (block 220). Next, an inquiry is made as to whether or not my current index is greater than or equal to zero (diamond 221). If the answer to this inquiry is no, then a null is returned (bubble 222). On the other hand, if the answer to this inquiry is yes, then the current Source Range object in my fine table is returned (bubble 223).

Figure 12:
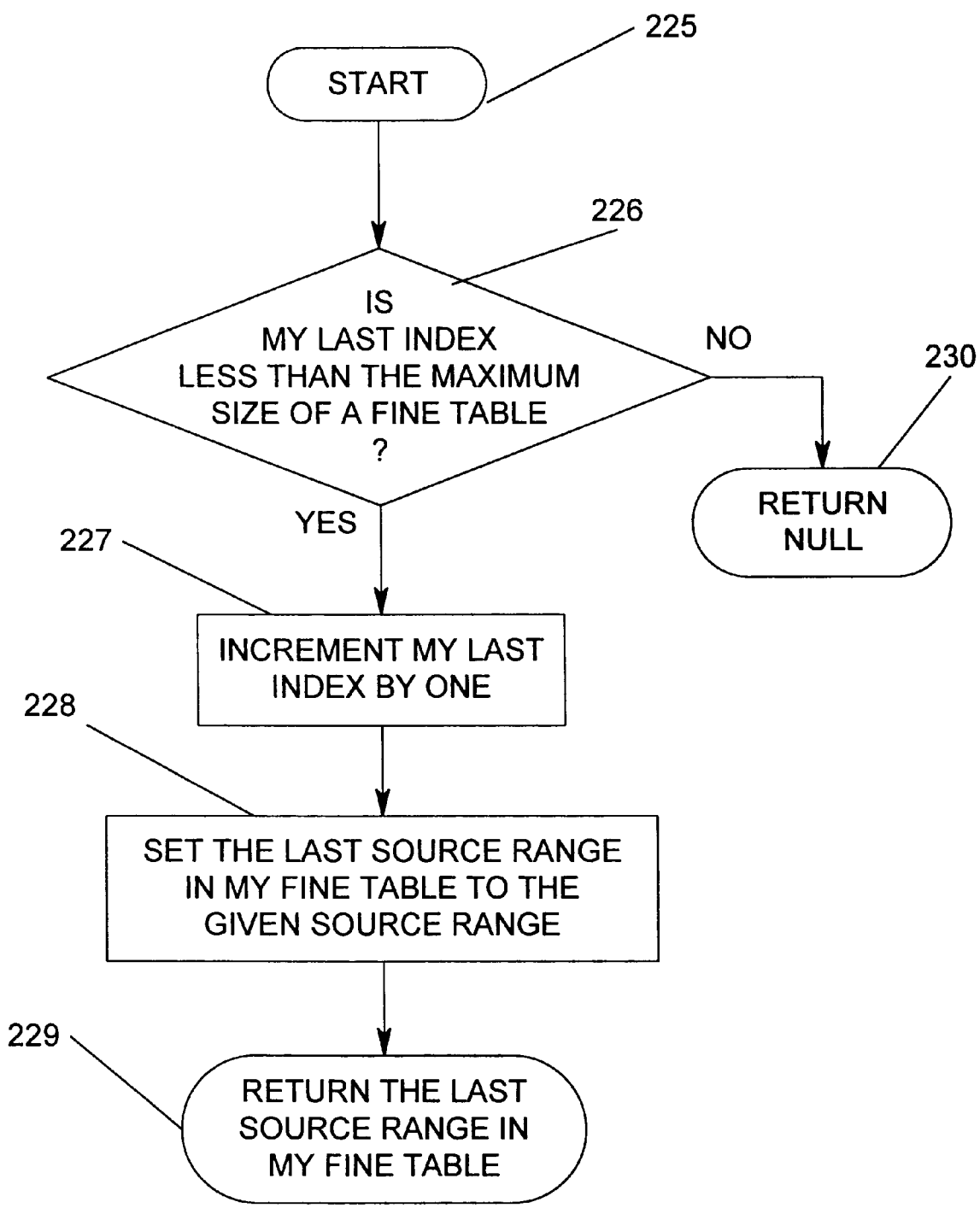
FIG. 12 is a flow chart of a process for creating a Source Range object from a Source Fine Table object.

Referring now to FIG. 12, a flow chart of a process for creating a Source Range object from a Source Fine Table object is illustrated. The process begins with a start bubble 225 followed by an inquiry as to whether or not my last index is less than the maximum size of a fine table (diamond 226). If the answer to this inquiry is yes, then my last index is incremented by one (block 227). Next, the last Source Range object in my fine table is set to the given Source Range object (block 228). Finally, the last Source Range object in my fine table is returned (bubble 229). If the answer to the inquiry depicted by the diamond 226 is no, then a null is returned (bubble 230).

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

APPENDIX I

The objects are fully defined in the C++ programming language.

Defining a source range from starting and ending offsets, FIGS. 3A & 3B a) is there a root source table?
   Yes
   No: a) construct a coarse table and make it the root source table
b) compute the first and last index from my base and the given starting and ending offsets
c) is my last index less than the last index?
   Yes: a) set my last index to the last index
   No:
d) construct a source range from the first and last index
e) is there space available for the source range in the source table (see FIGS. 8A and 8B)?
   Yes:
   No: a) construct a coarse table containing the previous root source table
      b) make the newly constructed table the root source table
      c) insert the source range into the source table (see FIGS. 8A and 8B)

Determining the primary source of a Source object, FIG. 4 a) is this a null source?
   Yes:
   No: a) is there a root source table?
      Yes: a) find the source range containing the index of this source (see FIGS. 7A and 7B)
         b) is the source range an inlined range?
         Yes: a) return a new source constructed from the index of the inlined function in the source range
         No:
      No:
b) return this source Constructing an inlined Source object, FIGS. 5A and 5B a) is the given index of the source of the inlined function call null?
   Yes: a) set the index of this source to the given index of the source of the inlined function definition
      b) return
   No:
b) is the given index of the source of the inlined function definition null?
   Yes: a) set the index of this source to the given index of the source of the inlined function call
      b) return
   No:
c) is there a root source table?
   Yes:
   No: construct a coarse table and take it the root source table
d) can a source range in the source table be adjusted to include this inlined source (see FIGS. 6A & 6B).
   Yes: a) set the index of this source to the last index of the adjusted source range
      b) is the index of this source greater than my last index?
      Yes: a) set last index to the index of this source
      No:
   No: a) increment my last index by one
      b) set the index of this source to my last index
      c) insert an inlined source range into the source table whose first and last indexes are the same as the index of this source (see FIGS. 8A and 8B)

Adjusting a range from a Source Coarse Table object, FIG. 6A & 6B a) is my last index greater than or equal to zero?
   Yes: a) is the last table in my coarse table a fine table?
      Yes: a) adjust the last source range in the fine table (if possible) for the given inlined source range (see FIGS. 10A and 10B)
      No: a) adjust the last table range in the coarse table (if possible) for the given inlined source range (see FIGS. 6A & 6B)
   No: a) return null
b) was the last range of the table adjusted?
   Yes: a) is the last index of the last range in my coarse table less than the last index of the adjusted source range?

APPENDIX I-continued

The objects are fully defined in the C++ programming language.

```
           Yes: a) set the last index of the last range in my coarse
                   table to the last index of the adjusted source
                   range
               No:
               b) return the adjusted source range
           No: a) return null
Finding a range from a Source Coarse Table object, FIGS. 7A and 7B a) is my current index greater than or equal to zero?
    Yes: a) is the given index greater than or equal to the first
            index of the current table range in my coarse table?
        Yes: a) is the given index less than or equal to the last
                index of the current table range in my coarse
                table?
            Yes: a) is the current table in my coarse table
                    a fine table?
                Yes: a) return the source range for
                        the given index found in the
                        fine table (see FIG. 11A and
                        11B)
                No: a) return the source range for
                        the given index found in the
                        coarse table (see FIGS. 7A and
                        7B)
            No:
        No:
    No:
b) set my current index to the result of the binary search for the
    given index in my coarse table;
c) is my current index greater than or equal to zero?
    Yes: a) is the current table in my coarse table a fine table?
        Yes: a) return the source range for the given index found
                in the fine table (see FIGS. 11A and 11B)
        No: a) return the source range for the given index found
                in the coarse table (see FIGS. 7A and 7B)
    No: a) return null
Creating a range from a Source Coarse Table object, FIGS. 8A and 8B a) is my last index greater than or equal to zero?
    Yes: a) is the last table in my coarse table a fine table?
        Yes: a) create a new source range (if possible) in the
                fine table (see FIG. 12)
        No: a) create a new source range (if possible) in the
                coarse table (see FIGS. 8A and 8B)
    No: a) return null
b) was a new source range created?
    Yes: a) is the last index of the last table range in my coarse
            table
            less than the last index of the created source range?
        Yes: a) set the last index of the last table range in my
                coarse table to the last index of the created
                source range
        No:
        No: a) is my last index less than the maximum index of a coarse
                table?
            Yes: a) increment my last index by one
                b) is this a level zero coarse table?
                    Yes: a) create a new fine table at my last index
                            in my coarse table
                        b) create a new source range in the created
                            fine table (see FIG. 12)
                    No: a) create a new coarse table at my last
                            index in my coarse table
                        b) create a new source range in the created
                            coarse table (see FIG. 8A & 8B)
                No: a) return null
c) return the created source range
Constructing a Source Coarse Table object above a given coarse table,
FIG. 9 a) set my last index to zero
b) set my current index to negative one
c) set my coarse level to the level of the given coarse table plus one
d) set the first table range of my coarse table to a newly created
    table range constructed from the given coarse table
```

APPENDIX I-continued

The objects are fully defined in the C++ programming language.

```
Adjusting a range from a Source Fine Table object, FIGS. 10A and 10B a) is my last index greater than or equal to zero?
    Yes: a) is the last source range in my fine table an inlined
            source range?
        Yes: a) is the last source range in my fine table the
                same as the given source range except that the
                difference of the inlined function definition
                indexes is less than 100 more than the difference
                of the first and last indexes of the last source
                range in my fine table?
            Yes: a) set the first index of the given source
                    range to the first index of the last
                    source range in my fine table plus the
                    difference of the indexes of the inlined
                    function definition
                b) set the last index of the given source
                    range to its first index
                c) is the last index of the given source
                    range greater than the last index of the
                    last source range in my fine table?
                    Yes: a) set the last index of the last
                            source range in my fine table
                            to the last index of the given
                            source range
                    No:
                d) return the last source range of my fine
                    table
            No:
        No:
    No:
b) return null
Finding a range from a Source Fine Table object, FIGS. 11A & 11B a) is my current index greater than or equal to zero?
    Yes: a) is the given index greater than or equal to the first
            index of the current source range in my fine table?
        Yes: a) is the given index less than or equal to the last
                index of the current source range in my fine
                table?
            Yes: a) return the current source range in my
                    fine table
            No:
        No:
    No:
b) set my current index to the result of the binary search for the
    given index in my fine table
c) is my current index greater than or equal to zero?
    Yes: a) return the current source range in my fine table
    No: a) return null
Creating a range from a Source Fine Table object, FIG. 12 a) is my last index less than the maximum size of a fine table?
    Yes: a) increment my last index by one
        b) set the last source range in my fine table to the given
            source range
        c) return the last source range in my fine table
    No: a) :return null
```

What is claimed is:

1. A computer-implemented object-oriented process for relating objects in a compiler to source code locations during an operation of compiling a source program into machine instructions for a target computer, said process comprising the steps of:

a. registering source files and their ranges of line numbers for a source type;

b. parsing each language element of said source program in order to create source-related compiler objects;

c. creating a source object as the value of an instance variable for each of said compiler objects in order to relate it to its location in said source program;

d. where a function is being inlined by said compiler into the place of a source-related compiler object representing a call on said function within the body of another function, further including the step of, for each source-related compiler object in said function being inlined, creating a duplicate compiler object having a special kind of source object that represents a call history that combines two other source objects which are:
   1) the source object of said source-related object in said function being inlined; and,
   2) the source object of said compiler object representing said call on said function;
 e. generating machine instruction objects from said compiler objects; and,
 f. for each of said machine instruction objects, storing in an instance variable the source object for the source-related compiler object from which it is generated.

2. The process as in claim 1 further including a process for defining a source range from starting and ending offsets for use in relating objects in a compiler to source code locations, said process comprising the steps of:
   a. determining if there is a root source table, and if so;
   b. computing first and last index from said starting and ending offsets; and,
   c. constructing a source range from said first and last index.

3. The process as in claim 2 where there is no root source table further including the step of constructing a coarse table and making it said root source table.

4. The process as in claim 3 further including the steps of:
   a. determining if there is available space for said source range in said source table, and if not;
   b. constructing a coarse table containing said root source table;
   c. making said coarse table constructed in the preceding step said root source table; and,
   d. inserting said source range into said source table.

5. The process as in claim 4 further including the steps of:
   a. determining if my last index is greater than or equal to zero, and if so;
   b. determining if last table in my coarse table is a fine table, and if not;
   c. creating a new source range in a fine table;
   d. if said last table in my coarse table is a fine table, creating a new source range in a coarse table;
   e. determining whether a new source range was created, and if so;
   f. determining if last index of last table range in my coarse table is less than last index of said created source range, and if so;
   g. setting last index of last table range in said my coarse table to last index of said created source range; and,
   h. returning said created source range.

6. The process as in claim 5 wherein a new source range was not created, further including the steps of:
   a. determining if my last index is less than maximum index of a coarse table, and if so;
   b. incrementing my last index by one;
   c. determining if said coarse table is a level zero coarse table, and if so;
   d. creating a new fine table at my last index in my coarse table;
   e. creating a new source range in said fine table; and,
   f. returning said source range created in the preceding step.

7. The process as in claim 6 wherein said coarse table is determined not to be a level zero coarse table, further including the steps of:
   a. creating a new coarse table at my last index in my coarse table;
   b. creating a new source range in said coarse table by repeating all of the steps in claims 5, 6 and 7;
   e. returning said created source range.

8. The process as in claim 1 further including a process for determining the primary source of a source object for use in relating objects in a compiler to source code locations, said process comprising the steps of:
   a. finding source range containing index of said source object;
   b. determining if said source range is an inlined range, and if so;
   c. returning a new source object constructed from index of inlined function definition in said source range.

9. The process as in claim 8 wherein step a thereof further includes the steps of:
   a. determining if my current index is greater than or equal to zero, and if so;
   b. determining if said index of said source object is greater than or equal to first index of current table range in my coarse table, and if so;
   c. determining if said index of said source object is less than or equal to last index of current table range in my coarse table, and if so;
   d. determining if said current table in my coarse table is a fine table, and if yes,
   e. returning range for index found in said fine table.

10. The process as in claim 9 wherein said current table in my coarse table is not a fine table, further including the step of returning range for index found in said coarse table.

11. The process as in claim 9 wherein my current index is determined not to be greater than or equal to zero, further including the steps of:
   a. setting my current index to result of a binary search for said index in my coarse table;
   b. determining if current table in said my coarse table is a fine table, and if so;
   c. returning source range for index found in said fine table.

12. The process as in claim 11 wherein said current table in said my coarse table is not a fine table, further including the step of returning source range for index found in said coarse table.

13. The process as in claim 1 further including a process for constructing an inlined source object for use in relating objects in a compiler to source code locations, said process comprising the steps of:
   a. determining if a given index of a source object of an inlined function call is null, and if not;
   b. determining if a given index of a source object of an inlined function definition is null, and if not;
   c. determining if there is a root source table, and if not;
   d. constructing a coarse table and making it the root source table;
   e. determining if a source range in said source table can be adjusted to include said inlined source object, and if yes;
   f. setting an index of said inlined source object to the last index of an adjusted source range;
   g. determining if the index of said inlined source object is greater than my last index, and if so;

h. setting my last index to said index of said inlined source object.

14. The process as in claim 13 wherein it is determined that a source range in said source table cannot be adjusted to include said inlined source object, further including the steps of:
   a. incrementing my last index by one;
   b. setting index of said inlined source object to my last index; and,
   c. inserting an inlined source range into source table whose first and last indexes are the same as index of said inlined source object.

15. The process as in claim 13 wherein said step of determining if a source range in said source table can be adjusted to include said inlined source object further includes the steps of:
   a. determining if last table in my coarse table is a fine table, and if so;
   b. adjusting last source range in said fine table for said inlined source object;
   c. determining if last index of last range in said my coarse table is less than last index of said adjusted source range, and if so;
   d. setting said last index of said last range in my coarse table to last index of said adjusted source range; and,
   e. returning said adjusted source range.

16. The process as in claim 15 where said last table in my coarse table is not a fine table, adjusting last table range in said coarse table for said inlined source source.

17. The method as in claim 1 further including a process for constructing a source coarse table object above a given coarse table for use in relating objects in a compiler to source code locations, said process comprising the steps of:
   a. setting my last index to zero;
   b. setting my current index to a negative one;
   c. setting my coarse level to level of given coarse table plus one; and,
   d. setting first table range of my coarse table to a newly created table range constructed from said given coarse table.

18. The process as in claim 1 further including a process for finding a range from a source fine table object for use in relating objects in a compiler to source code locations, said process comprising the steps of:
   a. determining if my current index is greater than or equal to zero, and if so;
   b. determining if given index is greater than or equal to first index of current source range in my fine table, and if so;
   c. determining if given index is greater than or equal to first index of current source range in my fine table, and if so; and,
   d. returning said current source range in my fine table.

19. The process as in claim 18 wherein it is determined that my current index is not greater than or equal to zero, further including the steps of:
   a. setting my current index to result of a binary search for said given index in my fine table; and,
   b. returning said current source range in my fine table.

20. The process as in claim 18 wherein it is determined that said given index is greater than or equal to the first index of the current source range in my fine table, further including the steps of:
   a. setting my current index to result of a binary search for said given index in my fine table; and,
   b. returning said current source range in my fine table.

21. The process as in claim 18 wherein it is determined that said given index is less than or equal to the last index of the current source range in my fine table, further including the steps of:
   a. setting my current index to result of a binary search for said given index in my fine table; and,
   b. returning said current source range in my fine table, comprising the steps of:
      a. determining if given index of a source of an inlined function call null, and if not;
      b. determining if given index of a source of an inlined function definition null, and if not;
      c. determining if there is a root source table, and if not;
      d. construction a coarse table and making it the root source table;
      e. determining if a source range in said source table can be adjusted to include this inlined source, and if yes;
      f. setting index of this source to last index of adjusted source range;
      g. determining if index of this source is greater than my last index, and if so; and,
      h. setting my last index to said index of this source.

22. The process as in claim 1 further including a process for creating a range from a source fine table object for use in relating objects in a compiler to source code locations comprising the steps of:
   a. determining if my last index is less than the maximum size of a fine table, and if so;
   b. incrementing my last index by one;
   c. setting last source range in my fine table to the given source range; and,
   d. returning the last source range in my fine table.

* * * * *